US011858471B2

(12) United States Patent
Lesley

(10) Patent No.: US 11,858,471 B2
(45) Date of Patent: Jan. 2, 2024

(54) FORK MOUNT BICYCLE CARRIER

(71) Applicant: Yakima Products, Inc., Lake Oswego, OR (US)

(72) Inventor: Kevin Lesley, Beaverton, OR (US)

(73) Assignee: Yakima Products, Inc., Lake Oswego, OR (US)

( * ) Notice: Subject to any disclaimer, the term of this patent is extended or adjusted under 35 U.S.C. 154(b) by 317 days.

(21) Appl. No.: 17/114,309

(22) Filed: Dec. 7, 2020

(65) Prior Publication Data
US 2021/0261066 A1 Aug. 26, 2021

Related U.S. Application Data

(63) Continuation of application No. 15/942,338, filed on Mar. 30, 2018, now Pat. No. 10,857,949.

(60) Provisional application No. 62/486,866, filed on Apr. 18, 2017.

(51) Int. Cl.
*B60R 9/10* (2006.01)
*B60R 9/048* (2006.01)

(52) U.S. Cl.
CPC ............... *B60R 9/10* (2013.01); *B60R 9/048* (2013.01)

(58) Field of Classification Search
CPC ....... B60R 9/048; B60R 9/10; Y10S 224/924; B62K 2206/00; B62K 2025/025
See application file for complete search history.

(56) References Cited

U.S. PATENT DOCUMENTS

| 357,287 A | 2/1887 | Nolte |
| 376,055 A | 1/1888 | Hopkins et al. |
| 668,791 A | 2/1901 | Blake et al. |
| 993,954 A | 5/1911 | Budlong |
| 1,505,883 A | 8/1924 | Gleason |
| 2,271,452 A | 1/1942 | Carroll |
| 2,576,222 A | 11/1951 | Hill |
| 2,630,257 A | 3/1953 | Nielsen |
| 2,764,438 A | 9/1956 | Haviland |
| 2,765,016 A | 10/1956 | Parsegian |
| 2,840,288 A | 6/1958 | Broddon |

(Continued)

FOREIGN PATENT DOCUMENTS

| CH | 272137 A | 11/1950 |
| CN | 102458927 A | 5/2012 |

(Continued)

OTHER PUBLICATIONS

U.S. Patent and Trademark Office, Non-Final Office Action regarding U.S. Appl. No. 15/942,338, dated Sep. 18, 2019, 45 pages.

(Continued)

*Primary Examiner* — Brian D Nash
(74) *Attorney, Agent, or Firm* — Kolisch Hartwell, P.C.

(57) ABSTRACT

A bicycle carrier for securing a bicycle on top of a vehicle is disclosed, including a fork mount and a tail mount. The fork mount is configured to clamp a first crossbar of the vehicle, while the tail mount is configured to clamp a second crossbar of the vehicle. The fork mount includes a passage and a pair of inserts configured to be secured at opposing ends of the passage. A skewer is configured to protrude through apertures in a front fork of a bicycle, through the pair of inserts, and through the passage to secure the front fork to the fork mount.

20 Claims, 12 Drawing Sheets

(56) References Cited

U.S. PATENT DOCUMENTS

| | | | |
|---|---|---|---|
| 2,895,748 A | 7/1959 | Oldham | |
| 2,948,560 A | 8/1960 | Rop | |
| 2,999,378 A | 9/1961 | Blair | |
| 3,165,353 A | 1/1965 | Weise | |
| 3,204,839 A | 9/1965 | Yuda et al. | |
| 3,239,115 A | 3/1966 | Bott et al. | |
| 3,242,704 A | 3/1966 | Barreca | |
| 3,258,820 A | 7/1966 | Steinberg | |
| 3,292,222 A | 12/1966 | Steinberg | |
| 3,460,788 A | 8/1969 | Goldman | |
| 3,662,435 A | 5/1972 | Allsop | |
| 3,668,791 A | 6/1972 | Salzman et al. | |
| 3,719,297 A | 3/1973 | Nowicki | |
| 3,807,761 A * | 4/1974 | Brilando | B62K 25/02 |
| | | | 280/279 |
| 3,828,993 A | 8/1974 | Carter | |
| 3,843,001 A | 10/1974 | Willis | |
| 3,848,784 A | 11/1974 | Shimano et al. | |
| 3,848,785 A | 11/1974 | Bott | |
| 3,861,533 A | 1/1975 | Radek | |
| 3,893,568 A | 7/1975 | Lile | |
| 3,900,923 A | 8/1975 | Thomas | |
| 3,906,593 A | 9/1975 | Caveney et al. | |
| 3,912,139 A | 10/1975 | Bowman | |
| 3,922,018 A | 11/1975 | Shook | |
| 3,999,409 A | 12/1976 | Bell | |
| 4,021,888 A | 5/1977 | Aimar | |
| 4,028,915 A | 6/1977 | Stahl | |
| 4,057,182 A | 11/1977 | Kolkhorst et al. | |
| 4,057,183 A | 11/1977 | Ness | |
| 4,112,557 A | 9/1978 | Salomon | |
| 4,114,409 A | 9/1978 | Scire | |
| 4,126,228 A | 11/1978 | Bala et al. | |
| 4,193,171 A | 3/1980 | Lichowsky | |
| 4,261,496 A | 4/1981 | Mareydt et al. | |
| 4,274,569 A | 6/1981 | Winter et al. | |
| 4,310,951 A | 1/1982 | Riedel | |
| 4,326,320 A | 4/1982 | Riedel | |
| 4,386,709 A | 6/1983 | Graber | |
| 4,400,038 A | 8/1983 | Hosokawa | |
| 4,424,636 A | 1/1984 | Everest | |
| 4,433,786 A | 2/1984 | Wahl | |
| 4,442,961 A | 4/1984 | Bott | |
| 4,453,290 A | 6/1984 | Riedel | |
| 4,469,257 A | 9/1984 | Parker | |
| 4,473,176 A | 9/1984 | Harper | |
| 4,501,354 A | 2/1985 | Hoffman | |
| 4,547,980 A | 10/1985 | Olivieri | |
| 4,553,292 A | 11/1985 | Pradier et al. | |
| 4,555,830 A | 12/1985 | Petrini et al. | |
| 4,596,080 A | 6/1986 | Benoit et al. | |
| 4,614,047 A | 9/1986 | Arieh et al. | |
| 4,616,771 A | 10/1986 | Heideman | |
| 4,619,122 A | 10/1986 | Simpson | |
| 4,621,873 A | 11/1986 | Weinstein et al. | |
| 4,624,063 A | 11/1986 | Delery | |
| 4,629,104 A | 12/1986 | Jacquet | |
| 4,646,401 A | 3/1987 | Morell | |
| 4,670,946 A | 6/1987 | Olivieri | |
| 4,678,147 A | 7/1987 | Barnes et al. | |
| 4,683,620 A | 8/1987 | Valsecchi et al. | |
| 4,694,666 A | 9/1987 | Bellingham et al. | |
| 4,702,401 A | 10/1987 | Graber et al. | |
| 4,724,692 A | 2/1988 | Turin et al. | |
| 4,727,630 A | 3/1988 | Alan | |
| 4,728,019 A | 3/1988 | Olliges | |
| 4,735,350 A | 4/1988 | Kamaya | |
| 4,759,137 A | 7/1988 | Lederer | |
| 4,761,859 A | 8/1988 | Calabrigo | |
| 4,761,898 A | 8/1988 | Courvoisier et al. | |
| 4,763,957 A | 8/1988 | Poehlmann et al. | |
| 4,770,011 A | 9/1988 | Constant | |
| 4,789,206 A | 12/1988 | Ozaki | |
| 4,796,337 A | 1/1989 | Marxer | |
| 4,842,148 A | 6/1989 | Bowman | |
| 4,887,754 A | 12/1989 | Boyer et al. | |
| 4,912,817 A | 4/1990 | Sandreid | |
| 4,934,572 A | 6/1990 | Bowman et al. | |
| 4,938,475 A | 7/1990 | Sargeant et al. | |
| 4,951,487 A | 8/1990 | Sheils | |
| 4,964,287 A | 10/1990 | Gaul | |
| 5,003,711 A | 4/1991 | Nerrinck et al. | |
| 5,005,390 A | 4/1991 | Giannini et al. | |
| 5,007,260 A | 4/1991 | Sharp | |
| 5,007,568 A | 4/1991 | Da Vault | |
| 5,009,350 A | 4/1991 | Schill et al. | |
| 5,014,890 A | 5/1991 | Perry | |
| 5,020,708 A | 6/1991 | Kalbach | |
| 5,022,672 A | 6/1991 | Kawai | |
| 5,027,628 A | 7/1991 | De Rocher et al. | |
| 5,037,019 A | 8/1991 | Sokn | |
| 5,042,705 A | 8/1991 | Johansson | |
| 5,052,605 A | 10/1991 | Johansson | |
| 5,065,921 A | 11/1991 | Mobley | |
| 5,067,644 A | 11/1991 | Coleman | |
| 5,083,350 A | 1/1992 | Sandreid | |
| 5,092,504 A | 3/1992 | Hannes et al. | |
| 5,118,125 A | 6/1992 | Plunkett | |
| 5,119,980 A | 6/1992 | Grim et al. | |
| 5,127,564 A | 7/1992 | Romero | |
| 5,135,330 A | 8/1992 | Chen | |
| 5,165,762 A | 11/1992 | Phillips | |
| 5,169,044 A | 12/1992 | Englander | |
| 5,172,454 A | 12/1992 | Martignago | |
| 5,193,254 A | 3/1993 | Geisinger | |
| 5,201,911 A | 4/1993 | Lee | |
| 5,203,484 A | 4/1993 | Englander | |
| 5,226,341 A | 7/1993 | Shores | |
| 5,232,134 A | 8/1993 | Allen | |
| 5,253,792 A | 10/1993 | Foster et al. | |
| 5,265,897 A | 11/1993 | Stephens | |
| 5,275,319 A | 1/1994 | Ruana | |
| 5,288,001 A | 2/1994 | Locarno | |
| 5,291,763 A | 3/1994 | Cuisinot | |
| 5,314,104 A | 5/1994 | Lee | |
| 5,316,192 A | 5/1994 | Ng | |
| 5,338,142 A * | 8/1994 | Gonzales | B60B 27/026 |
| | | | 411/407 |
| 5,357,690 A | 10/1994 | Ho | |
| 5,362,173 A | 11/1994 | Ng | |
| 5,377,886 A | 1/1995 | Sickler | |
| 5,390,840 A | 2/1995 | Arvidsson | |
| 5,416,952 A | 5/1995 | Dodge | |
| 5,419,479 A | 5/1995 | Evels et al. | |
| 5,426,826 A | 6/1995 | Takimoto | |
| 5,427,286 A | 6/1995 | Hagerty | |
| 5,435,475 A | 7/1995 | Hudson et al. | |
| 5,456,397 A | 10/1995 | Pedrini | |
| 5,476,200 A | 12/1995 | Wong | |
| 5,479,836 A | 1/1996 | Chang | |
| 5,492,258 A | 2/1996 | Brunner | |
| 5,499,430 A | 3/1996 | Strazar | |
| 5,511,894 A | 4/1996 | Ng | |
| 5,516,020 A | 5/1996 | Lawler et al. | |
| 5,526,555 A | 6/1996 | Battistella et al. | |
| 5,526,971 A | 6/1996 | Despain | |
| 5,560,498 A | 10/1996 | Porter | |
| 5,560,666 A | 10/1996 | Vieira et al. | |
| 5,570,825 A | 11/1996 | Cona | |
| 5,573,165 A | 11/1996 | Bloemer et al. | |
| 5,579,972 A | 12/1996 | Despain | |
| 5,582,044 A | 12/1996 | Bolich | |
| 5,598,959 A | 2/1997 | Lorensen et al. | |
| 5,611,472 A | 3/1997 | Miller | |
| 5,624,063 A | 4/1997 | Ireland | |
| 5,690,259 A | 11/1997 | Montani | |
| 5,692,659 A | 12/1997 | Reeves | |
| 5,699,684 A | 12/1997 | Sulin | |
| 5,699,945 A | 12/1997 | Micklish | |
| 5,709,521 A | 1/1998 | Glass et al. | |
| 5,730,343 A | 3/1998 | Settelmayer | |
| 5,738,258 A | 4/1998 | Farrow et al. | |
| 5,745,959 A | 5/1998 | Dodge | |
| 5,749,694 A | 5/1998 | Ackerman et al. | |

(56) References Cited

U.S. PATENT DOCUMENTS

| | | | |
|---|---|---|---|
| 5,752,298 A | 5/1998 | Howell | |
| 5,762,248 A | 6/1998 | Englander et al. | |
| 5,769,292 A | 6/1998 | Cucheran et al. | |
| 5,775,555 A | 7/1998 | Bloemer et al. | |
| 5,779,116 A | 7/1998 | Rösch et al. | |
| 5,820,002 A | 10/1998 | Allen | |
| 5,833,074 A | 11/1998 | Phillips | |
| 5,845,827 A | 12/1998 | Reising | |
| 5,862,964 A | 1/1999 | Moliner | |
| 5,875,947 A | 3/1999 | Noel et al. | |
| 5,924,614 A | 7/1999 | Kuntze et al. | |
| 5,988,402 A | 11/1999 | Mayfield | |
| 6,036,069 A | 3/2000 | Sayegh | |
| 6,053,336 A | 4/2000 | Reeves | |
| 6,062,450 A | 5/2000 | Noel et al. | |
| 6,079,601 A | 6/2000 | Murray | |
| 6,112,965 A | 9/2000 | Lundgren | |
| 6,167,735 B1 | 1/2001 | Brown | |
| 6,283,310 B1 | 9/2001 | Dean et al. | |
| 6,382,480 B1 | 5/2002 | Egly et al. | |
| 6,401,502 B1 | 6/2002 | Yang | |
| 6,422,441 B1 | 7/2002 | Settelmayer et al. | |
| 6,425,509 B1 | 7/2002 | Dean et al. | |
| 6,460,708 B2 | 10/2002 | Dean et al. | |
| 6,460,743 B2 | 10/2002 | Edgerly et al. | |
| 6,494,351 B1 | 12/2002 | Dean | |
| 6,561,398 B1 | 5/2003 | Cole et al. | |
| RE38,162 E | 7/2003 | Brown | |
| 6,601,712 B2 | 8/2003 | Dean et al. | |
| 6,681,971 B2 | 1/2004 | Laverack et al. | |
| 6,684,667 B2 | 2/2004 | Young | |
| 6,736,300 B2 | 5/2004 | Deakin | |
| 6,748,630 B2 | 6/2004 | Livingston | |
| 6,758,380 B1 | 7/2004 | Kolda | |
| 6,793,186 B2 | 9/2004 | Pedersen | |
| 6,851,590 B2 | 2/2005 | Dean | |
| 6,938,782 B2 | 9/2005 | Dean et al. | |
| 6,997,657 B1 | 2/2006 | Saward | |
| 7,004,365 B2 | 2/2006 | Ingram | |
| 7,108,163 B1 | 9/2006 | Pedrini | |
| 7,237,704 B2 | 7/2007 | Dean | |
| D561,680 S | 2/2008 | Foley et al. | |
| D562,217 S | 2/2008 | Davis et al. | |
| 7,357,283 B2 | 4/2008 | Settelmayer | |
| 7,726,528 B2 | 6/2010 | Foley | |
| 7,726,529 B2 | 6/2010 | Foley | |
| 7,726,725 B2 | 6/2010 | Thelen et al. | |
| 7,757,914 B2 | 7/2010 | Book et al. | |
| D622,208 S | 8/2010 | Sautter et al. | |
| 8,136,709 B2 | 3/2012 | Jeli et al. | |
| 8,196,789 B2 | 6/2012 | Kraeuter et al. | |
| 8,210,407 B2 | 7/2012 | Sautter et al. | |
| 8,281,625 B2* | 10/2012 | Prescott | B60R 9/10 70/201 |
| 8,297,570 B2 | 10/2012 | Noyes | |
| 8,505,793 B2 | 8/2013 | Foley | |
| D703,605 S * | 4/2014 | Sautter | D12/408 |
| 9,216,699 B2* | 12/2015 | Flaherty | B60R 9/10 |
| 9,283,884 B2 | 3/2016 | Sautter et al. | |
| 9,845,057 B2* | 12/2017 | Settelmayer | B60R 9/048 |
| 9,873,385 B2 | 1/2018 | Tsai | |
| 10,300,865 B2* | 5/2019 | D'Angelo | B60R 9/048 |
| 10,857,949 B2 | 12/2020 | Lesley | |
| 2001/0040139 A1* | 11/2001 | Dean | B60R 9/10 224/924 |
| 2002/0026816 A1 | 3/2002 | Katsouros et al. | |
| 2002/0053581 A1 | 5/2002 | Peschmann et al. | |
| 2002/0125282 A1 | 9/2002 | Laverack et al. | |
| 2003/0080267 A1 | 5/2003 | Eslick | |
| 2003/0146257 A1 | 8/2003 | Dean | |
| 2006/0054573 A1 | 3/2006 | Dean et al. | |
| 2006/0060622 A1 | 3/2006 | Prenger | |
| 2006/0237500 A1 | 10/2006 | Settelmayer | |
| 2006/0249466 A1 | 11/2006 | Wang | |
| 2007/0012738 A1 | 1/2007 | Grim | |
| 2007/0119877 A1 | 5/2007 | Foley | |
| 2007/0210127 A1 | 9/2007 | Book et al. | |
| 2007/0235489 A1 | 10/2007 | Jeli et al. | |
| 2008/0053926 A1 | 3/2008 | Foley | |
| 2008/0164292 A1 | 7/2008 | Farney | |
| 2009/0184189 A1 | 7/2009 | Soderberg et al. | |
| 2009/0236382 A1 | 9/2009 | Sautter et al. | |
| 2010/0078454 A1 | 4/2010 | Sautter et al. | |
| 2011/0132946 A1 | 6/2011 | Sautter et al. | |
| 2011/0139839 A1 | 6/2011 | Foley | |
| 2011/0139841 A1 | 6/2011 | Sautter et al. | |
| 2013/0062379 A1 | 3/2013 | Sautter et al. | |
| 2013/0175308 A1 | 7/2013 | Sautter et al. | |
| 2014/0143990 A1 | 5/2014 | Sautter et al. | |
| 2014/0144960 A1 | 5/2014 | Condon et al. | |
| 2015/0028076 A1 | 1/2015 | Budd et al. | |
| 2015/0210222 A1 | 7/2015 | Kisaka et al. | |
| 2016/0023615 A1 | 1/2016 | Detweiler et al. | |
| 2016/0362053 A1 | 12/2016 | Sautter et al. | |
| 2018/0072237 A1* | 3/2018 | Kuschmeader | B60R 9/10 |

FOREIGN PATENT DOCUMENTS

| | | |
|---|---|---|
| CN | 202686178 U | 1/2013 |
| DE | 2556352 A1 | 6/1977 |
| DE | 3034750 A1 | 4/1982 |
| DE | 3912692 A1 | 11/1989 |
| DE | 4208064 C2 | 8/1993 |
| EP | 0161441 A1 | 11/1985 |
| EP | 0220784 A1 | 5/1987 |
| EP | 0224288 A1 | 6/1987 |
| EP | 1299263 B1 | 3/2006 |
| FR | 2221329 A1 | 10/1974 |
| FR | 2251187 A5 | 6/1975 |
| FR | 2332155 A1 | 6/1977 |
| FR | 2420454 A1 | 10/1979 |
| FR | 2428545 A1 | 1/1980 |
| FR | 2633569 A1 | 1/1990 |
| GB | 2303344 A | 2/1997 |
| IT | 1189908 B | 2/1988 |
| IT | 1236808 B | 4/1993 |
| JP | 10138847 A | 5/1998 |
| WO | 9708017 A1 | 3/1997 |
| WO | 9810959 A1 | 3/1998 |
| WO | 0138141 A1 | 5/2001 |
| WO | 0192062 A1 | 12/2001 |
| WO | 2004076237 A1 | 9/2004 |
| WO | 2009158358 A1 | 12/2009 |
| WO | 2013040267 A1 | 3/2013 |

OTHER PUBLICATIONS

U.S. Patent and Trademark Office, Non-Final Office Action regarding U.S. Appl. No. 15/942,338, dated Apr. 21, 2020, 6 pages.

China National Intellectual Property Administration, First Office Action regarding Chinese Patent Application No. 201780034989.X, dated Sep. 1, 2021, 6 pages.

Yakima Products, Inc., Locking Ski Mount Literature, Jan. 1989, 1 page.

Yakima Products, Inc., The New Yakima Over-Center Wheel Strap Literature, Jan. 1989, 1 page.

Bike Racks Plus, Roof Mounted Bike Racks sold by Bike Racks Plus. [Retrieved on Mar. 27, 2007], © 2002-2005. Retrieved from the Internet <URL:http://bike-racks-plus.com/RoofMounted Bike Rack.htm>, 3 pages.

Thule, U.S.A., 535xt Classic Fork Mount Instructions, undated, 5 pages.

\* cited by examiner

FORK MOUNT BICYCLE CARRIER

CROSS-REFERENCES

This application is a continuation of U.S. patent application Ser. No. 15/942,338 filed Mar. 30, 2018, which claims priority from U.S. Provisional Patent Application Ser. No. 62/486,866 filed Apr. 18, 2017. The complete disclosures of each application are hereby incorporated by reference in their entireties for all purposes. The following related patent and applications are also incorporated herein by reference, in their entireties, for all purposes: U.S. Pat. No. 6,938,782 and U.S. Patent Application Publication Nos. 2017/0349113 A1 and 2011/0139841 A1.

FIELD

This disclosure generally relates to cargo-specific rack accessories for vehicle rooftop racks. Specifically, it relates to accessories for carrying bicycles.

INTRODUCTION

The popularity of recreational and competitive cycling has grown substantially in recent years, with a corresponding expansion in the number of different bicycle designs and configurations. For instance, many bicycle designs have moved from a quick release skewer and dropouts to a through-axle system with through holes. The proliferation of front fork styles and dimensions has increased demand for bicycle carriers capable of accommodating multiple configurations.

SUMMARY

A bicycle carrier for securing a bicycle on top of a vehicle is disclosed, including a fork mount and a tail mount. The fork mount is configured to clamp a first crossbar of the vehicle, while the tail mount is configured to clamp a second crossbar of the vehicle. The fork mount includes a passage and a pair of inserts configured to be secured at opposing ends of the passage. A skewer is configured to protrude through apertures in a front fork of a bicycle, through the pair of inserts, and through the passage to secure the front fork to the fork mount.

The present disclosure provides systems, apparatuses, and methods relating to a fork mount bicycle carrier. In some examples, a fork mount bicycle carrier may include a set of pairs of selectable inserts and an interchangeable skewer. In some examples, the interchangeable skewer may include a cam lever assembly and an adjustment knob. In some examples, the fork mount may be configured to secure bicycles with both quick release and through-axle style front forks.

Features, functions, and advantages may be achieved independently in various examples of the present disclosure, or may be combined in yet other examples, further details of which can be seen with reference to the following description and drawings.

DESCRIPTION

Figure 1:
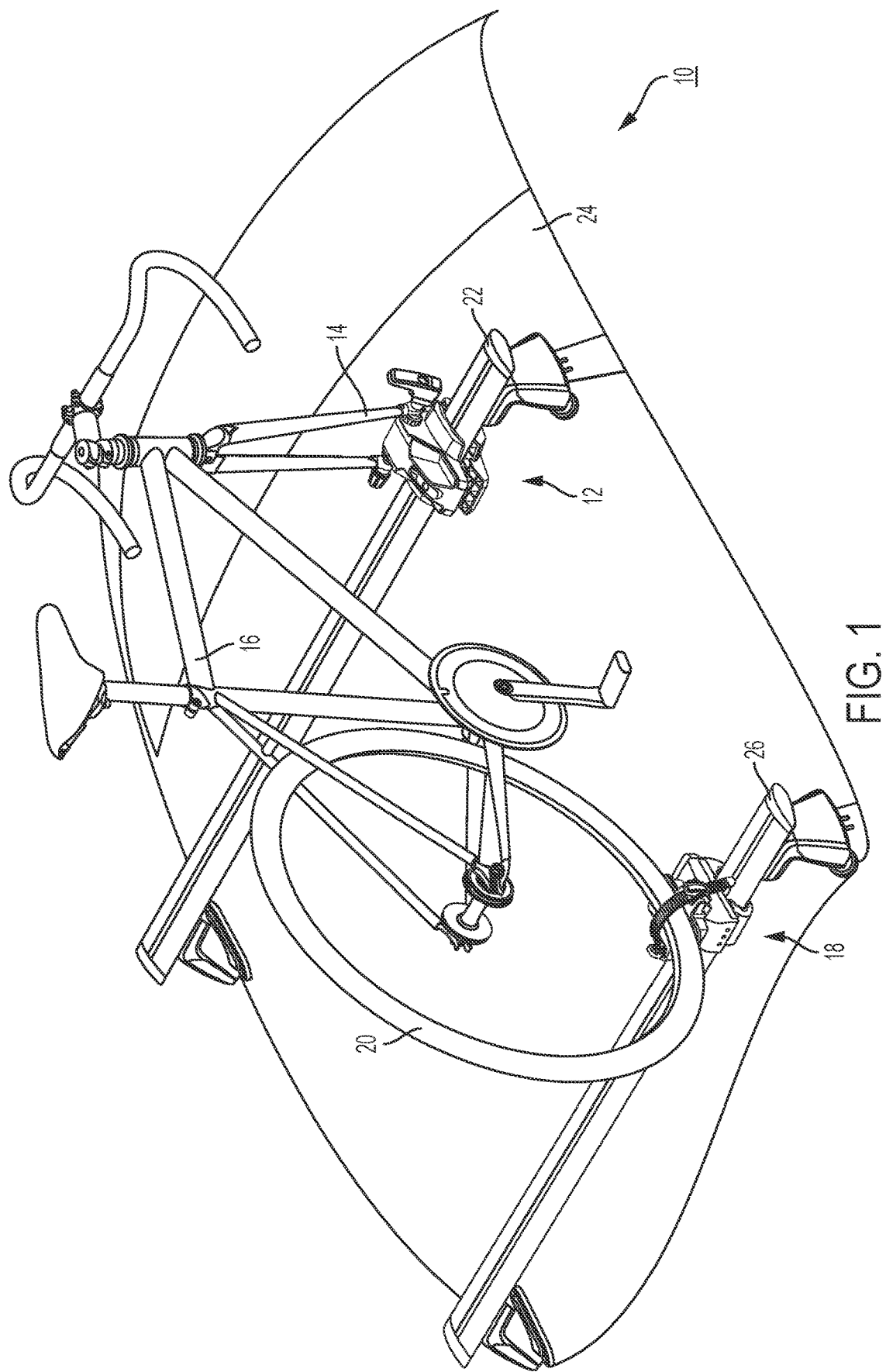
FIG. 1 is an isometric view of a bicycle mounted on a vehicle rooftop by an exemplary bicycle carrier according to the present disclosure.

Various aspects and examples of a bicycle carrier having a fork mount and a tail mount are described below and illustrated in the associated drawings. Unless otherwise specified, a bicycle carrier and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Overview

In general, a bicycle carrier for transporting a bicycle on a vehicle rooftop may include two accessories, a fork mount and a tail mount. The fork mount may be configured to attach a front fork of the bicycle to a first crossbar on the vehicle rooftop, after removing a front wheel from the bicycle. The tail mount may be configured to secure a rear wheel of the bicycle to a second crossbar on top of the vehicle.

The fork mount may include a connector assembly configured to secure the front fork to the fork mount. The connector assembly may include a pair of selectable inserts and an interchangeable skewer with a cam lever. The skewer may protrude through the selectable inserts, the front fork and the fork mount, to clamp the front fork against a clamping surface of the selectable inserts when the cam lever is in a closed position. In some examples a through-axle of the bicycle front fork may be used in place of the skewer. When a through-axle is interchanged for the skewer, the axle may similarly protrude through the selectable inserts, the front fork and the fork mount, to clamp the front fork against a clamping surface of the selectable inserts when the axle is secured.

The tail mount may include a wheel clamp assembly configured to secure the rear wheel to the tail mount. The wheel clamp assembly may include a wheel tray and a strap coupled to the wheel tray, which may extend through the rear wheel to hold the wheel against the wheel tray. The wheel tray may be configured to be disposed at a plurality of angles as measured around a long axis of the second crossbar.

The bicycle carrier may include security features on either or both of the fork mount and the tail mount, and coverings may be included over some areas for further protection. The fork mount and the tail mount may be separate structures, or may be mounted on and/or part of a single bicycle carrier. For example, the fork mount and/or the tail mount may be part of a tray rack.

Examples, Components, and Alternatives

The following sections describe selected aspects of exemplary bicycle carriers as well as related systems. The examples in these sections are intended for illustration and should not be interpreted as limiting the entire scope of the present disclosure. Each section may include one or more distinct embodiments or examples, and/or contextual or related information, function, and/or structure.

Example 1

As shown in FIGS. 1-5, this section describes a bicycle carrier generally indicated at 10 in FIG. 1. The carrier includes a fork mount 12 to secure a front fork 14 of a bicycle 16, and a tail mount 18 to secure a rear wheel 20 of the bicycle. The fork mount is coupled to a first crossbar 22 on the roof of a vehicle 24, and the tail mount is coupled to a second crossbar 26, where each crossbar has a long axis perpendicular to a longitudinal axis or a direction of travel of the vehicle.

Fork mount 12 and tail mount 18 are coupled at corresponding points along the long axes of crossbars 22, 26. That is, a line between the fork mount and the tail mount may be perpendicular to crossbars 22, 26 and parallel to the longitudinal axis of vehicle 24. A longitudinal axis of bicycle 16 may be parallel to the longitudinal axis of the vehicle, when the bicycle is secured to fork mount 12 and tail mount 18.

Figure 2:
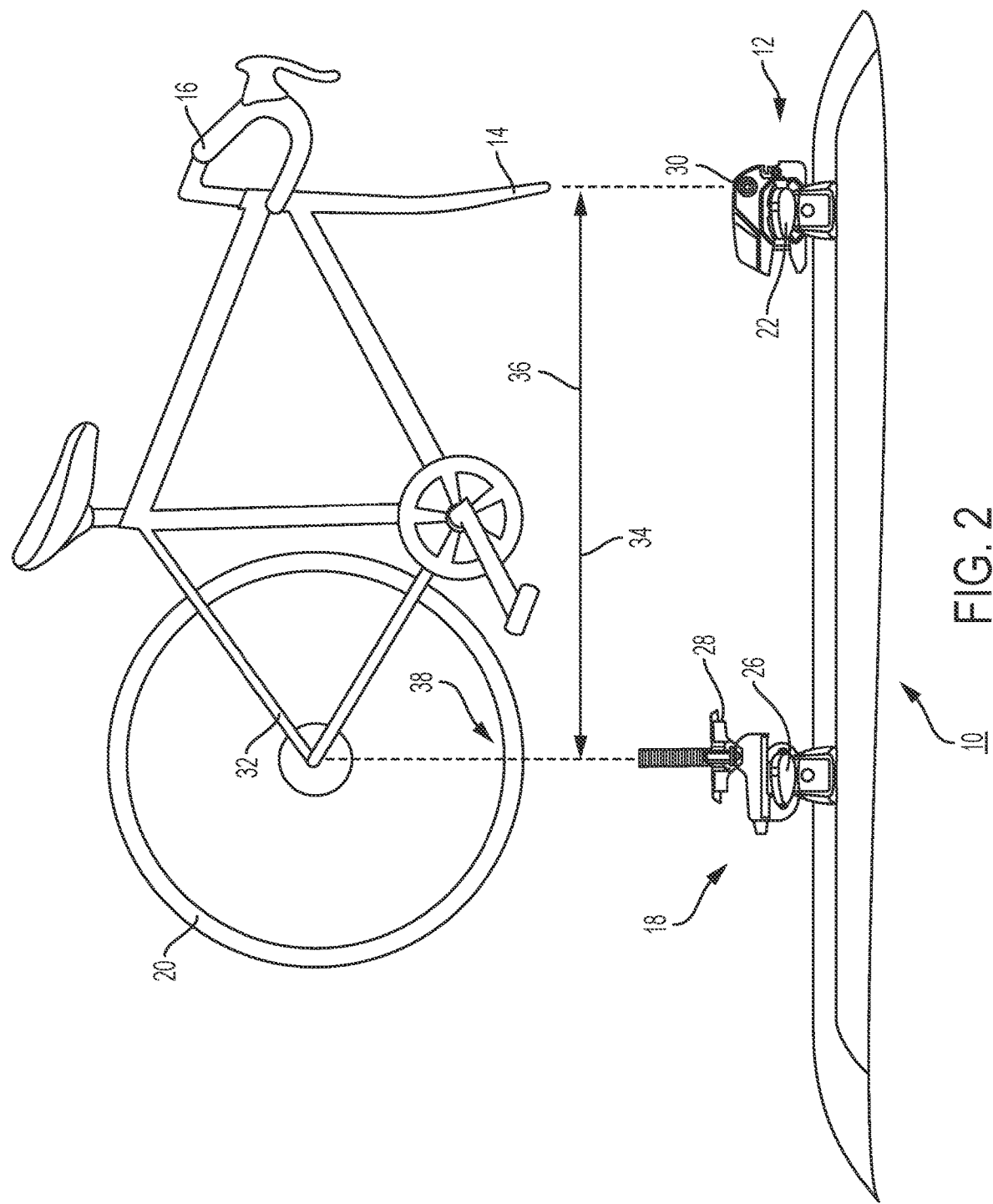
FIG. 2 is a schematic side view of the bicycle carrier of FIG. 1.

FIG. 2 shows a side view of bicycle 16 positioned for attachment to bicycle carrier 10. Since an outer rim and tire of rear wheel 20 of the bicycle is secured to a wheel tray 28 of tail mount 18, while front fork 14 is secured directly to inserts 30 of fork mount 12, bicycle 16 may be secured at an angle relative to the vehicle roof.

Front fork 14 is aligned with inserts 30 of fork mount 12, and a rear fork 32 of the bicycle is aligned with wheel tray 28 of tail mount 18. Wheel tray 28 and inserts 30 define a mount spacing 34. A bike length 36 is defined from front fork 14 to a point 38 on the outer rim of the rear wheel that is to be secured to wheel tray 28. As shown in FIG. 2, point 38 is immediately below rear fork 32. To be correctly aligned, bike length 36 and mount spacing 34 may match.

However, distance from rear fork 32 to front fork 14 may vary between bicycles, and mount spacing 34 may be determined by a distance between crossbars 22, 26. On some vehicles, the distance between crossbars may be fixed and not adjustable. Tail mount 18 may be adjustable in order to allow a variety of bikes to be secured to a vehicle with a particular crossbar spacing, or to allow a bike with a particular distance between forks to be secured to vehicles with a variety of crossbar spacings.

In some examples, wheel tray 28 may be adjustable between a plurality of longitudinal positions, as described further below. In the pictured example, wheel tray 28 of tail mount 18 may pivot about an axis parallel to the long axis of crossbar 26. Tail mount 18 may therefore be able secure a point on the outer rim of the rear wheel not immediately below rear fork 32. Bike length 36 may be thereby modified to match mount spacing 34, and rear fork 32 may not be aligned with wheel tray 28.

Alternatively, or in addition, one or both of fork mount 12 and tail mount 18 may be flipped to modify mount spacing 34. That is fork mount 12 may be mounted on crossbar 22 facing an opposite direction along the longitudinal axis of the vehicle, and tail mount 18 may be mounted on crossbar 26 facing an opposite direction along the longitudinal axis. As compared to the configuration shown in FIG. 2, flipping fork mount 12 may decrease mount spacing 34 and flipping tail mount 18 may increase the mount spacing.

Figure 3:
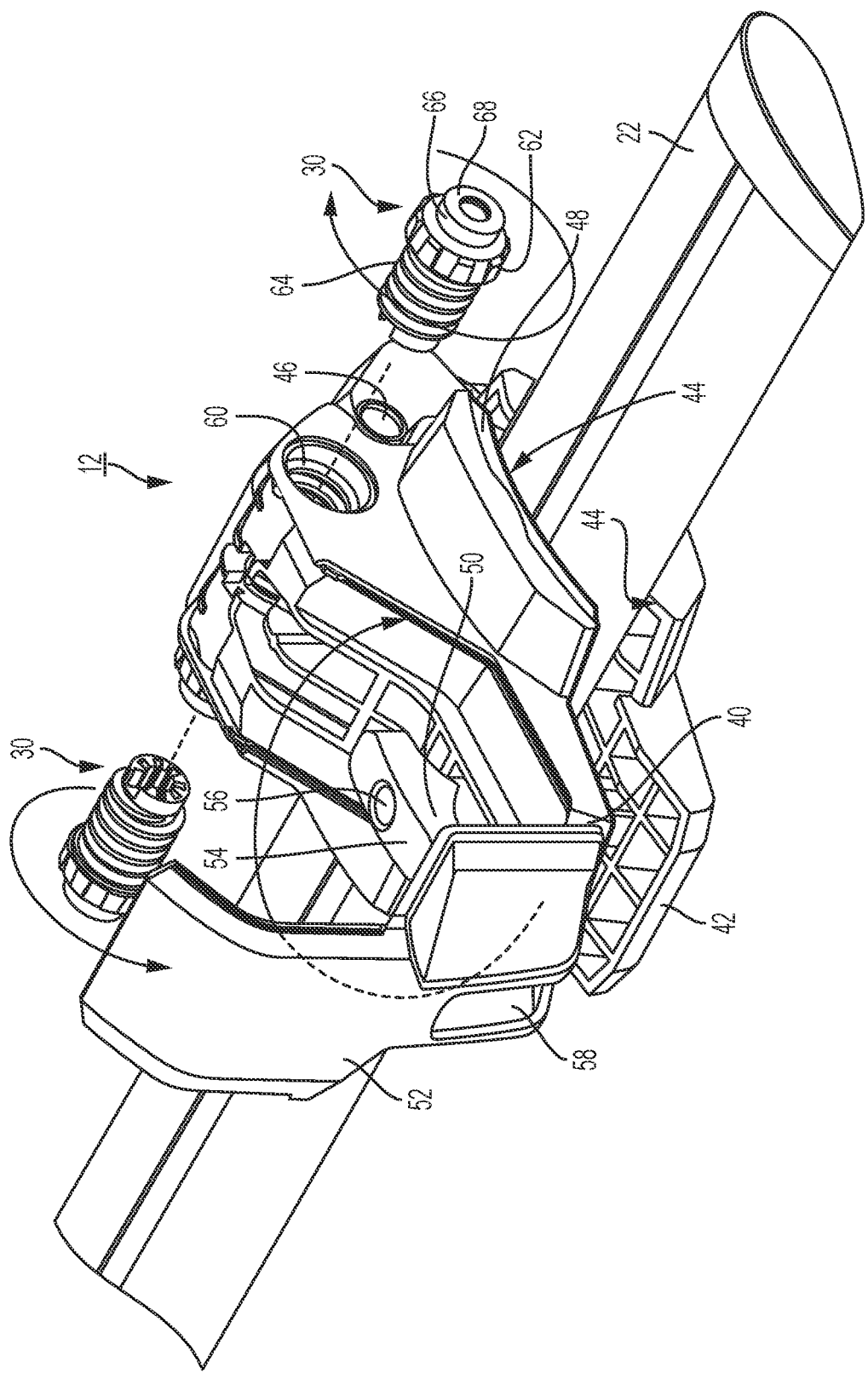
FIG. 3 is an isometric view of the fork mount of the bicycle carrier of FIG. 1, illustrating clamp actuation and insert installation.

FIG. 3 shows fork mount 12 on crossbar 22. In addition to inserts 30, the fork mount includes an upper half 40 and a lower half 42. Each half includes a clamping surface 44, and the lower half pivots relative to the upper half about a bar 46. Fork mount 12 may be coupled to crossbar 22 by clamping upper half 40 and lower half 42 about crossbar 22. The lower half may pivot through a plurality of positions, and may be described as having an open position and a closed position. The precise relationship of lower half 42 and upper half 40 when in the open position and the closed position may depend on a shape or size of crossbar 22.

In other examples, fork mount 12 may be unitary, lower half 42 may move along a vertical axis instead of pivoting, or the fork mount may be coupled to crossbar 22 by any effective means. For example, fork mount 12 may include a flexible strap extending around the crossbar, or may be bolted to the crossbar. For another example, fork mount 12 may include a side clamp such as is described in U.S. Patent Application Publication No. 2011/0139841 A1. Fork mount 18 may also comprise a portion of a tray rack that is coupled to first and second crossbars of a vehicle.

In the present example as shown in FIG. 3, clamping surfaces 44 are contoured to conform to crossbar 22, and to form a space between the clamping surface of upper half 40 and the clamping surface of lower half 42 when the lower half is in a closed position. The space may be sufficient to receive crossbar 22. The crossbar is shown in FIGS. 1-5 with an aerodynamic shape, but fork mount 12 may be configured to clamp to any type of crossbar including round, square, or ovoid.

One or both of clamping surfaces 44 may include a pad 48. The pad may include a compressible material to aid in a clamping action of fork mount 12 on the crossbar, and may be textured or have a surface material with a high frictional coefficient to improve grip on the crossbar. For example, pad 48 may be made of rubber, or foam with a silicone covering. Improved grip of clamping surfaces 44 may be desirable in order to prevent fork mount 12 from sliding along the long axis of crossbar 22 or twisting relative to the axis.

Fork mount 12 further includes a clamp actuator 50, and a cover 52. In FIG. 3, cover 52 is shown in an open position, while in FIG. 4 the cover is shown in a closed position. In the present example, cover 52 opens by pivoting about an axis parallel to crossbar 22 and is secured by a snap-fit feature. In other examples, the cover may pivot about alternative axes, may open by another mechanism, or may be entirely removable from fork mount 12. Any cover may be used, or the fork mount may not include a cover.

Clamp actuator 50 includes a handle 54 screwed onto a T-bolt 56. An aperture extends through upper half 40, sized to retain T-bolt 56 with handle 54 above upper half 40 and a head of the T-bolt below upper half 40. Once fork mount 12 has been positioned about crossbar 22, clamp actuator 50 may be used to secure upper half 40 relative to lower half 42. That is, handle 54 may be used to extend T-bolt 56 through lower half 42 and rotate the T-bolt such that the head of the T-bolt is received by a feature on a bottom surface of the lower half. Once the bolt head is received by the feature, handle 54 may be rotated relative to T-bolt 56 and screwed further onto the T-bolt to secure upper half 40 and lower half 42 about crossbar 22.

Figure 4:
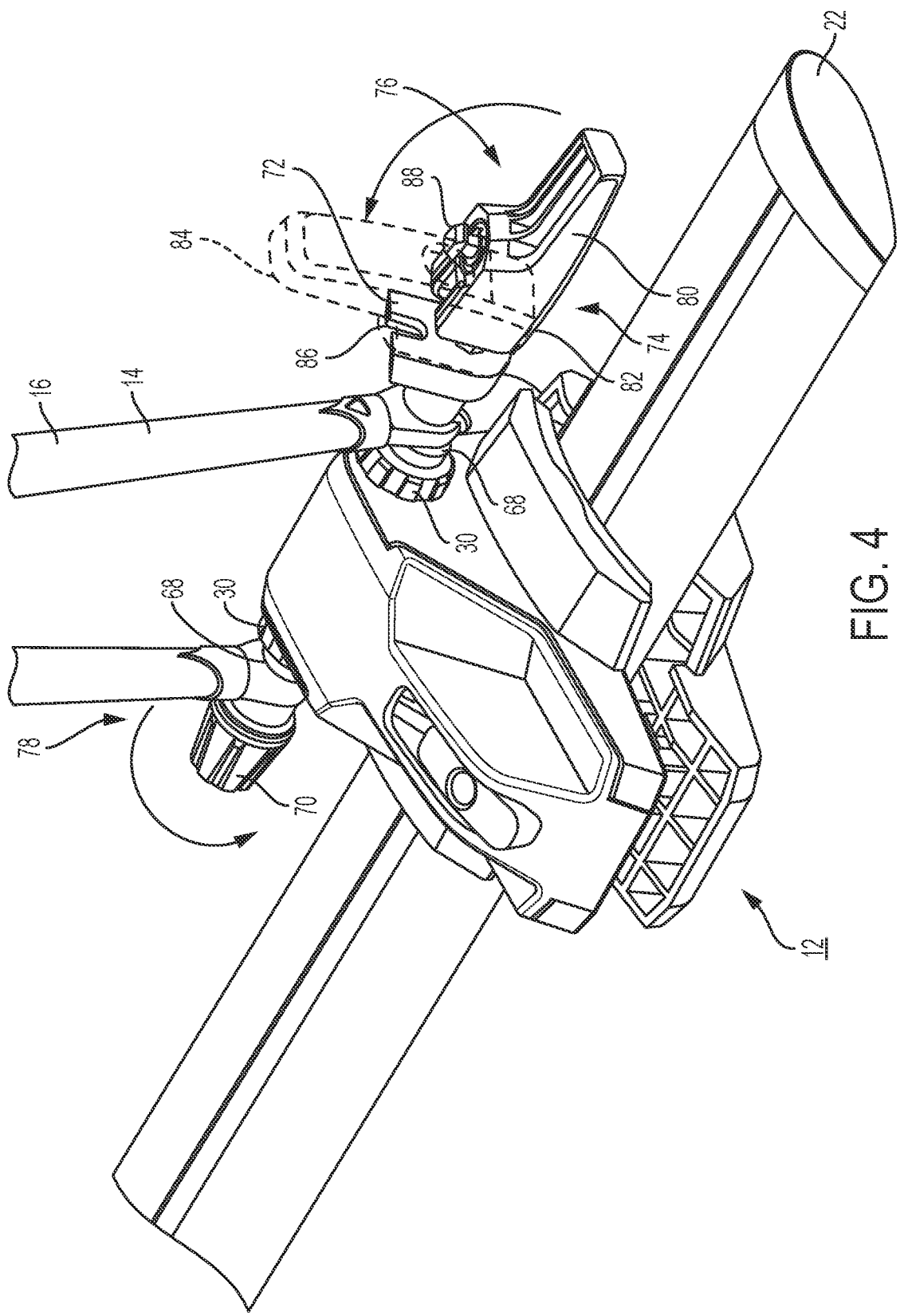
FIG. 4 is an isometric view of the fork mount of the bicycle carrier of FIG. 1, showing the bicycle front fork in secured and unsecured positions.

Cover 52 includes an elongate aperture 58. In order to close cover 52, handle 54 may be rotated until a lateral extent of the handle is aligned with aperture 58. When cover 52 is in a closed position, as shown in FIG. 4, handle 54 may extend up through the cover, with aperture 58 closely conforming to the handle. Cover 52 may thereby prevent rotation of handle 54, further securing fork mount 12 to crossbar 22 when in a closed position.

As shown in FIG. 3, upper half 40 of fork mount 12 includes a passage 60 extending through the mount parallel to the long axis of crossbar 22. The passage is configured to receive inserts 30 in first and second opposing ends. In the pictured example, passage 60 and inserts 30 are threaded. The inserts may be manually screwed into upper half 40, as indicated by the arrows. In other examples, inserts 30 may also be removably secured in passage 60 by fasteners or by any effective means.

Each insert 30 is annular, including a grip 62, an engaging portion 64, and a clamping portion 66 that has a lateral clamping surface 68. The engaging portion is entirely received by passage 60, while grip 62 and clamping portion 66 remain proud of the surface of upper half 40. Lateral clamping surface 68 may be partially or entirely planar and may be substantially perpendicular to passage 60. Grip 62 may be configured for manual manipulation by a user, to install and remove inserts 30 from fork mount 12. In other examples, grip 62 may include one or more tooling recesses or may have a hex shape for installation by wrench or other tool. Inserts 30 may further include any features or mechanisms appropriate to engage passage 60, upper half 40, or a bicycle front fork.

Fork mount 12 may include a set of pairs of matching inserts 30. A user may select and install a pair of inserts appropriate for each bicycle to be secured to fork mount 12. The user may switch pairs of inserts when changing bicycles, may leave one pair of inserts installed when repeatedly securing one bicycle, or may install or remove inserts as needed or preferred. Each pair of inserts may correspond to a bicycle front fork spacing standard, and a bicycle front wheel axle standard. A front fork spacing standard may also be referred to as hub width. A bicycle front wheel axle standard may include through-axle diameters, hub axle sleeve diameters, quick-release skewer diameters, and/or any relevant dimensional standard. A table of illustrative currently standard dimensions for front fork spacing and axle diameters is below, dimensions listed in millimeters (mm).

| Axle Diameter | Fork Spacing |
|---|---|
| Through-Axle | |
| 12 mm | 100 mm |
| 15 mm | 100 mm |
| 15 mm | 110 mm |
| 15 mm | 150 mm |
| Quick-Release | |
| 9 mm | 100 mm |

A set of inserts may include all known standards and combinations of standards, or may be a targeted subset of known standards. For example, a mountain bike set may be provided with pairs of inserts corresponding to common fork spacing and axle standards for mountain bikes. A set of inserts may include inserts configured to fit a specific make, model, and/or style of bicycle. Any dimension of an insert may be selected to correspond to a standard or to a dimension of a specific bicycle or group of bicycles.

In the current disclosure, a standard may include a dimension or set of dimensions published by any organization having authority in the art of bicycle design, a dimension or set of dimensions used by one or more bicycle manufactures in the design of bicycles, and/or any other dimension or range of dimensions known to those skilled in the art of bicycle design.

Each insert 30 has an inner diameter, that may be consistent through the length of the insert. The inner diameter may match an axle diameter, of a through axle and/or a quick-release axle. In some examples, insert 30 may have a variable inner diameter with a portion of the insert, such as clamping portion 66, having an inner diameter that matches an axle standard.

Each insert 30 may have an outer diameter that differs between grip 62, engaging portion 64, and clamping portion 66. Engaging portion 64 has an outer diameter appropriate to mate with passage 60, while grip 62 has a diameter sufficient to prevent the grip from being received by passage 60. The grip may also have a diameter comfortable for manual manipulation. Clamping portion 66 may have an outer diameter matching an adjustment knob 70 and a cam brace 72, shown in FIG. 4.

FIG. 4 shows fork mount 12 securing front fork 14 of bicycle 16. In the pictured example, bicycle 16 has a dropout style front fork 14. A skewer with a cam assembly 74 at a first end 76 and a threaded second end 78 extends through inserts 30 and passage 60. The cam assembly includes a cam lever 80 and brace 72.

Cam lever 80 may be movably fixed to the skewer, such that the lever may pivot about an axis perpendicular to the length of the skewer. The cam lever may pivot between two positions, an open position 82 and a closed position 84. In the open position cam lever 80 may be spaced from brace 72, while in the closed position the cam lever may engage the brace. Brace 72 may be slidably mounted on the skewer, such that when cam lever 80 engages the brace, the brace may in turn engage front fork 14 of bicycle 16.

As shown in FIG. 4, adjustment knob 70 is screwed onto threaded second end 78 of the skewer, opposite cam assembly 74. A first dropout of front fork 14 rests on the skewer between lateral clamping surface 68 of a first insert 30 and brace 72, while a second dropout of front fork 14 rests on the skewer between lateral clamping surface 68 of a second insert 30 and adjustment knob 70. Each of brace 72 and adjustment knob 70 may also have a lateral clamping surface that is partially or entirely planar, and is parallel and corresponding to lateral clamping surfaces 68.

Adjustment knob 70 may include a spring, such that a portion of the knob configured to abut front fork 14 may move a limited amount relative to a portion of the knob configured to engage second end 78 of the skewer. Such limited movement may allow a margin of error in tightening adjustment knob 70. For example, if adjustment knob 70 has been tightened until front fork 14 is firmly held, cam lever 80 might require a difficult level of force to operate, but instead adjustment knob 70 may compress and allow cam lever 80 to be easily pivoted to closed position 84.

As shown in FIG. 4, brace 72 of cam assembly 74 has an elongate shape with a slot 86 configured to mate with a catch 88 on an interior face of cam lever 80. As cam lever 80 pivots about its axis, catch 88 may slide through slot 86 of brace 72 toward second end 78 of the skewer. Cam assembly 74 may include a lock core housed in cam lever 80, configured to rotate catch 88 about an axis perpendicular to the extent of the cam lever when a key is turned.

Catch 88 includes an asymmetrical tab, configured such that when the catch is rotated to a first orientation shown in FIG. 4, the catch may slide through slot 86, but when the catch is rotated roughly 90 degrees to a second orientation, the catch may be prevented from sliding through slot 86. Cam lever 80 may be thereby allowed to pivot between open position 82 and closed position 84 when catch 88 is in the first orientation, but be prevented from pivoting between positions when catch 88 is in the second orientation. By turning a key to rotate catch 88 a user may hold front fork 14 of bicycle 16 against inserts 30, and prevent unauthorized removal of the bicycle. Other locking mechanisms may be included in cam assembly 74 or any component of fork mount 12. In some examples, brace 72 may be circular or square and may not include locking features. Both brace 72 and cam lever 80 may have any effective shape.

To secure a bicycle with a quick release front wheel, a user may grasp cam assembly 74 and insert the skewer through a first insert 30, through passage 60, and out of a second insert 30. The user may then thread adjustment knob 70 onto the protruding end of the skewer. After removing the front wheel of bicycle 16, including the quick release mechanism, the user may rest the dropouts of front fork 14 onto the skewer. The user may tighten adjustment knob 70 until the dropouts or tines of the front fork are lightly held against lateral clamping surfaces 68 of inserts 30. Cam lever 80 may then be pivoted from open position 82 to closed position 84, pushing against brace 72 and securing the dropouts or tines against clamping surfaces 68.

To secure a bicycle with a through-axle front fork, a user may remove the front wheel and the axle. The user may position the apertures of the tines of the front fork adjacent to inserts 30 and insert the axle through the aperture of a first tine, a first insert 30, passage 60, a second insert 30, and into an aperture of the second tine. The user may then secure the axle as normal, in other words secure the axle in the same manner as if fork mount 12 were a wheel. In some examples, securing the axle may include threading a first end of the axle into the aperture of the second tine and then operating a cam lever at a second end.

Figure 5:
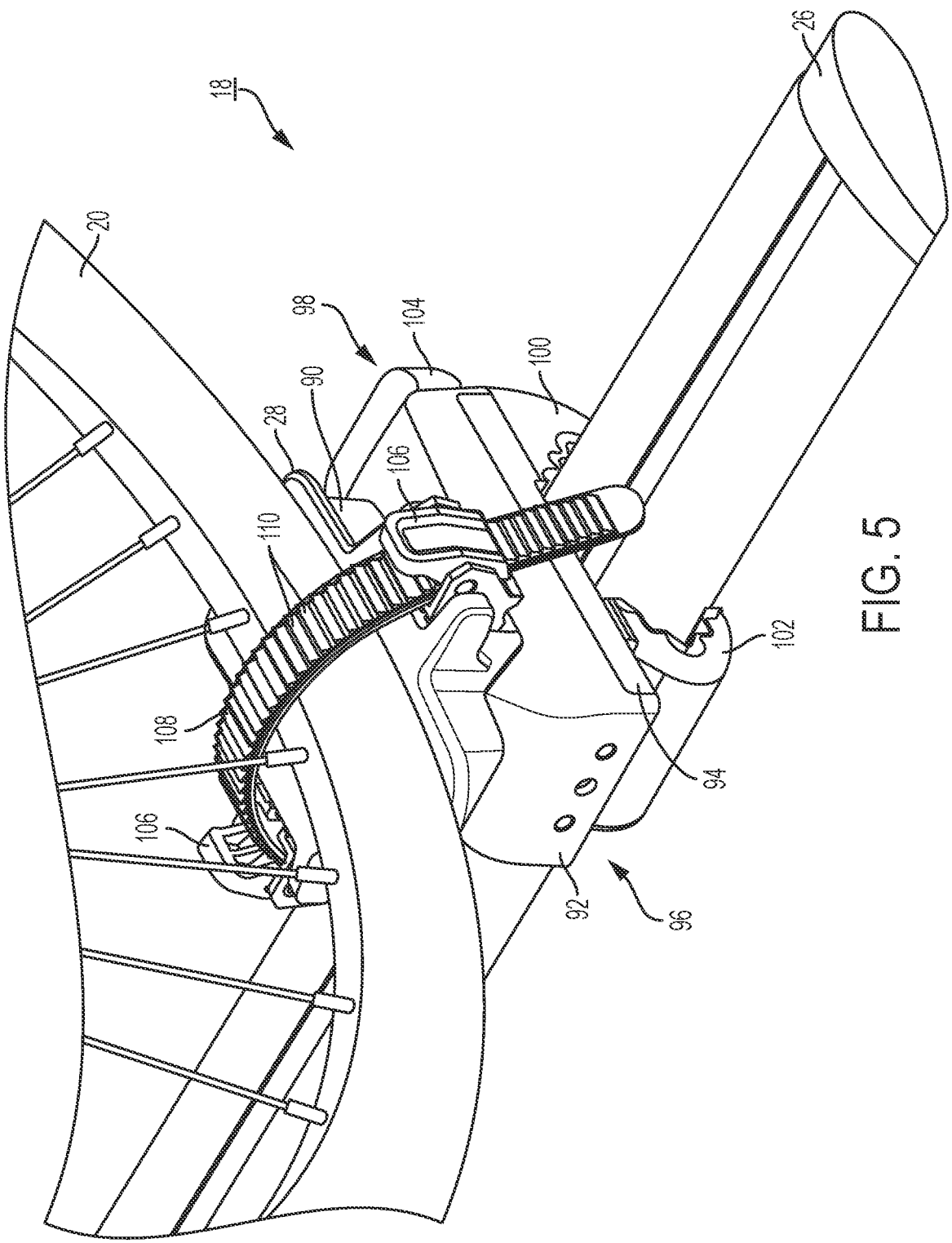
FIG. 5 is an isometric view of the tail mount of the bicycle carrier of FIG. 1.
Figure 6:
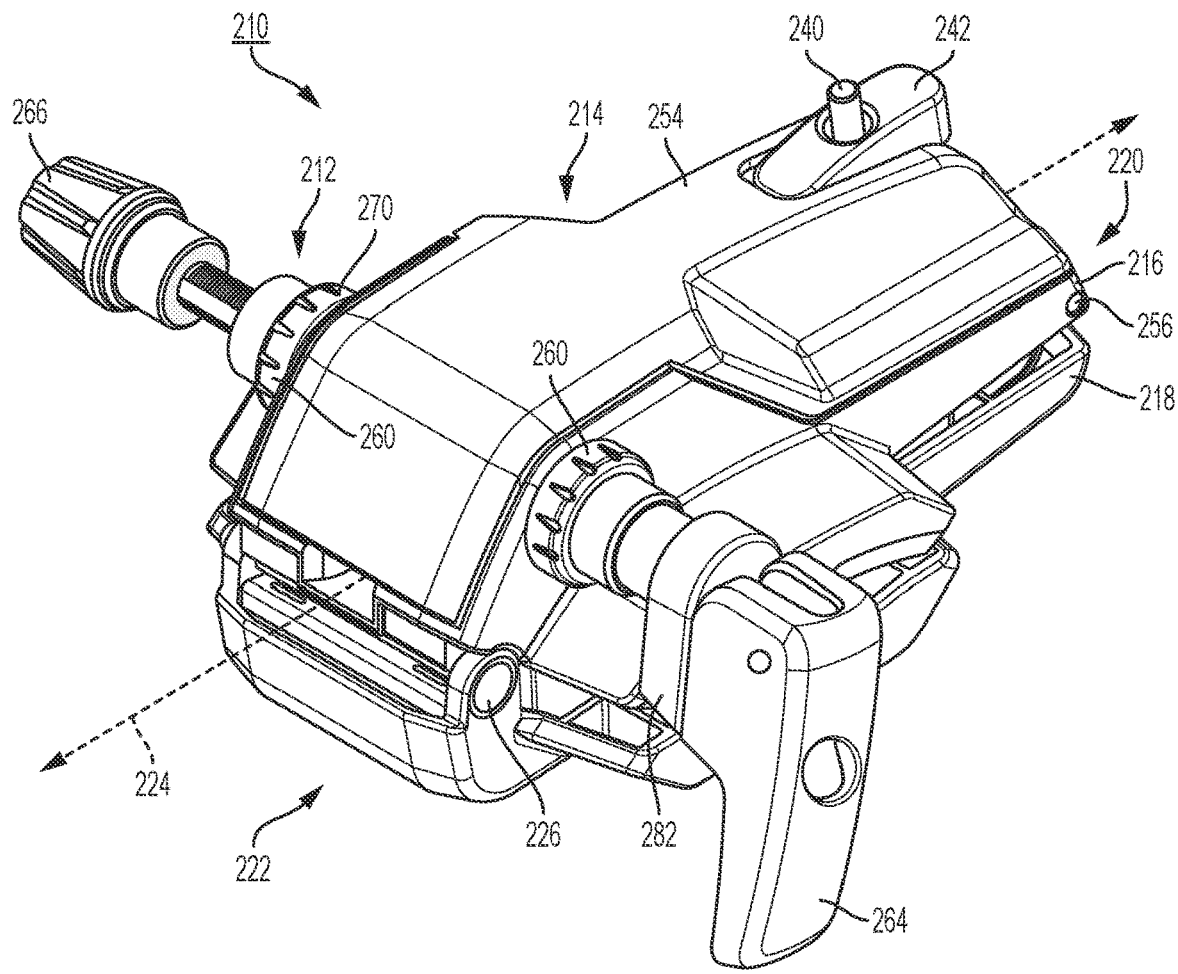
FIG. 6 is an isometric view of another example of a fork mount.

FIG. 5 shows rear wheel 20 of bicycle 16 secured by tail mount 18. The tail mount includes a wheel clamp assembly 90 and a body 92 with a clamp portion 94. The wheel clamp assembly is pivotably mounted to the body, which is secured to crossbar 26 by the clamp portion. In the pictured example, wheel clamp assembly 90 is mounted proximate a rear end 96 of body 92. In other examples, the assembly may be mounted at any point along the body including at a center point or proximate a front end 98.

Clamp portion 94 extends down from body 92 and includes a first arm 100, a second arm 102, and a clamp actuator 104. Clamp actuator 104 is configured such that rotating a handle of the actuator draws second arm 102 toward first arm 100 and thereby clamps crossbar 26 between the two arms. Each arm, 100, 102 includes an inner surface contoured to conform to a side of crossbar 26. Either or both of the inner surfaces may include a pad. The pad may include a compressible material to aid in a clamping action of fork mount 12 on the crossbar, and may be textured or have a surface material with a high frictional coefficient to improve grip on the crossbar. Improved grip of arms 100, 102 may be desirable in order to prevent tail mount 18 from sliding along the long axis of crossbar 26 or twisting relative to the axis.

In other examples, tail mount 18 may be coupled to crossbar 22 by any effective means. For example, the tail mount may include a flexible strap extending around the crossbar, or may be bolted to the crossbar. For another example, tail mount 18 may comprise a portion of a tray rack that is coupled to first and second crossbars of a vehicle.

Wheel clamp assembly 90 includes wheel tray 28 and two buckles 106 fixed on opposing sides of the wheel tray. A strap 108 extending through rear wheel 20 between the spokes of the wheel and engaging with buckles 106 secures the rear wheel against wheel tray 28. Wheel clamp assembly 90 may pivot about an axis parallel to the long axis of crossbar 26, such that rear wheel 20 may be held securely against wheel tray at points around the rim of the wheel different from a lowest point of the wheel.

Strap 108 is releasably anchored in a first of buckles 106, passed through rear wheel 20 and inserted in the second of buckles 106. A plurality of teeth 110 on strap 108 engage in a ratcheting manner with the second buckle, securing rear wheel 20 with increasing tension as strap 108 is drawn through the buckle. To release strap 108, a lever portion of the second buckle may be pivoted to disengage from teeth 110 and allow the strap to be pulled from the buckle.

Example 2

As shown in FIGS. 6-11, this section describes a fork mount generally indicated at 210. Fork mount 210 includes a connector assembly 212 and a head portion 214. The head portion is configured to selectively clamp to a first crossbar on a vehicle rooftop, where the crossbar has a long axis oriented perpendicular to a longitudinal axis of the vehicle. The connector assembly is configured to secure a bicycle front fork to the head portion.

Head portion 214 is comprised of an upper half 216 and a lower half 218, where the lower half is pivotable relative to the upper half. Upper half 216 and lower half 218 may open similarly to clamp jaws and the crossbar may be received between the upper and lower halves. Head portion 214 has a first end 220 and a second end 222, defining a mount axis 224 that is generally perpendicular to the crossbar when fork mount 210 is clamped to the crossbar. Lower half 218 pivots about a bar 226 disposed proximate the first end, while the second end opens to receive the crossbar.

Figure 7:
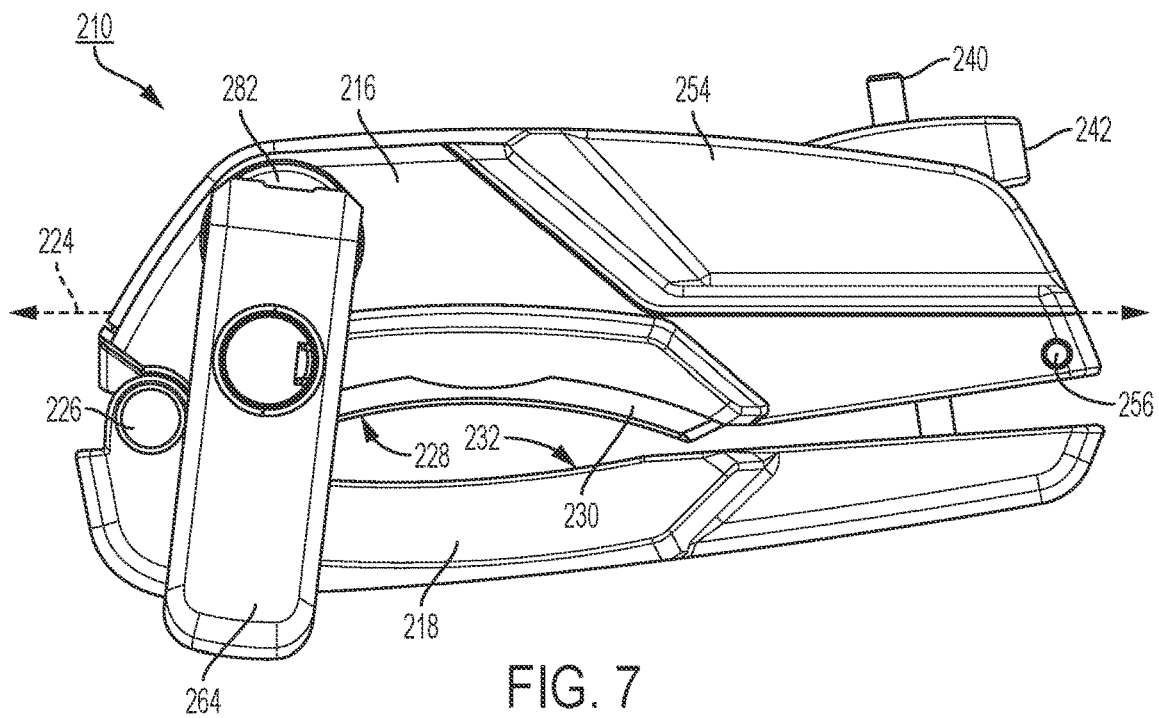
FIG. 7 is a side view of the fork mount of FIG. 6.

As shown in FIG. 7, upper half 216 includes a lower surface 228 contoured to closely conform to an upper surface of the crossbar. One or more pads 230 may be disposed on the lower surface, comprised of a compressible material that may also be suitable to improve grip of a clamping action on the crossbar or limit scoring and other damage to the crossbar due to a clamping action. Lower half 218 includes an upper surface 232 similarly contoured to closely conform to a lower surface of the crossbar.

Figure 8:
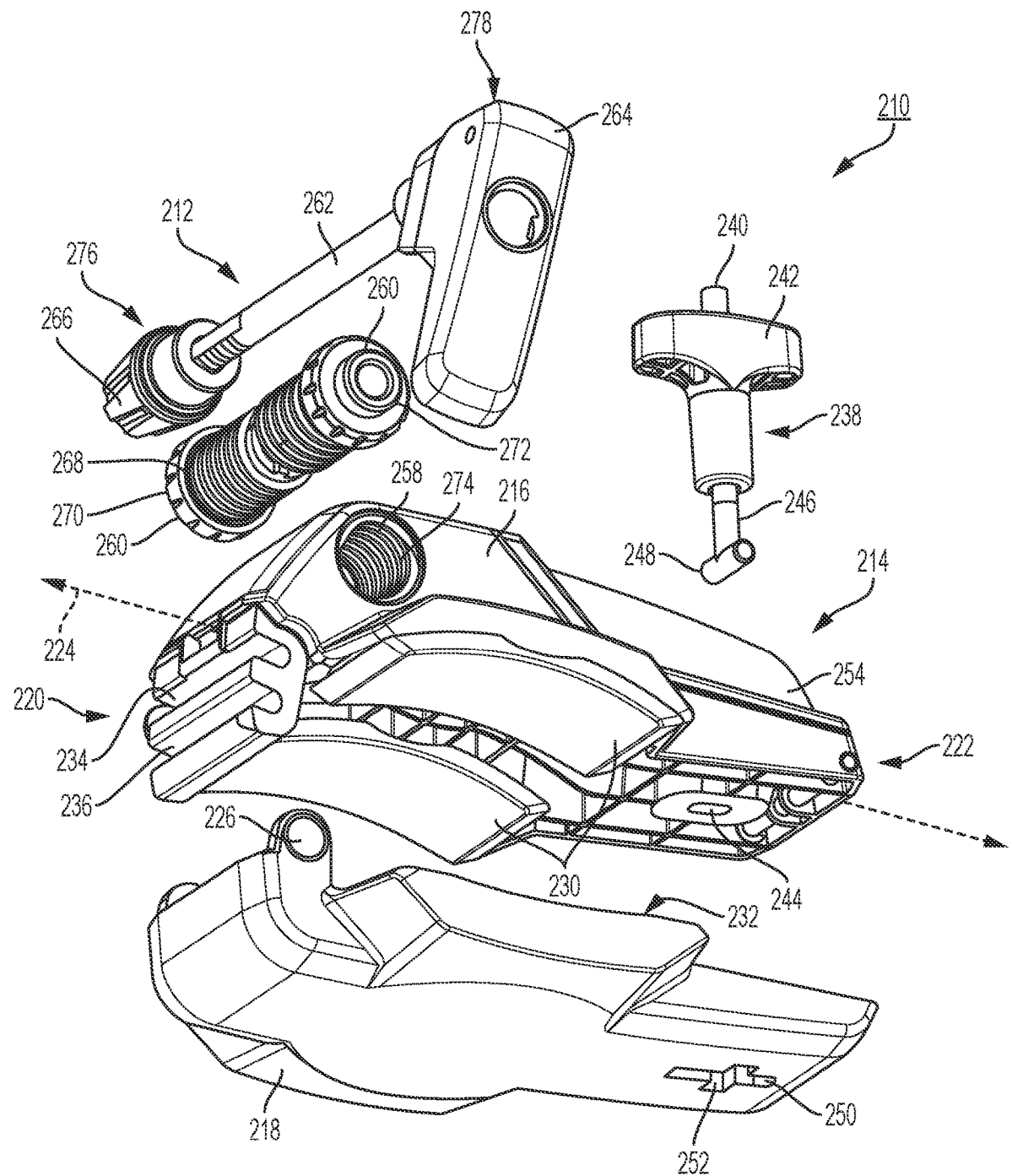
FIG. 8 is a partially exploded isometric view of the fork mount of FIG. 6.

Upper half 216 further includes two bar cradles 234, 236 with first cradle 234 disposed at a position spaced vertically upward from second cradle 236, as shown in FIG. 8. Both bar cradles 234, 236 are disposed at first end 220 of head portion 214. Lower half 218 includes corresponding bar 226, disposed at first end 220 and shaped to be accepted by either of the bar cradles. When the bar is received by a bar cradle, lower half 218 is pivotable about the bar, relative to upper half 216. Bar 226 and cradles 234, 236 may be parallel to the crossbar, such that lower half 218 pivots in a plane perpendicular to the crossbar.

A user of fork mount 210 may seat bar 226 in a chosen cradle, when clamping the mount to a crossbar of a vehicle. The choice of bar cradle may determine a spacing between lower surface 228 of upper half 216 and upper surface 232 of lower half 218, which is the space available to accommodate the crossbar. When the bar is received in first bar cradle 234, fork mount 210 may effectively grip a crossbar with a smaller cross-sectional area or diameter. When the bar is received in second bar cradle 236, fork mount 210 may accommodate a larger crossbar. Some examples may include one or more additional bar cradles, to accommodate a greater range of crossbar diameters. In some examples, lower half 218 may be pivotably fixed to upper half 216 in a single permanent configuration.

A clamp actuator 238 selectively secures upper half 216 and lower half 218 in a clamped position on the crossbar. In the pictured example, clamp actuator 238 is comprised of a T-bolt 240 and a handle 242 screwed or otherwise coupled to a top end of the bolt. A passage 244 extends vertically through upper half 216 of head portion 214, proximate second end 222. A shaft 246 of T-bolt 240 extends through passage 244 and is retained in the passage by a combination of handle 242 at a top side of passage 244, and a head 248 of the T-bolt at a bottom side of the passage.

An aperture 250 corresponding to passage 244 and sized to receive bolt head 248 extends through lower half 218. The aperture may have a vertical extent through lower half 218, and a lateral extend corresponding to a length of bolt head 248. The lateral extent of aperture 250 may be aligned with mount axis 224.

Figure 9:
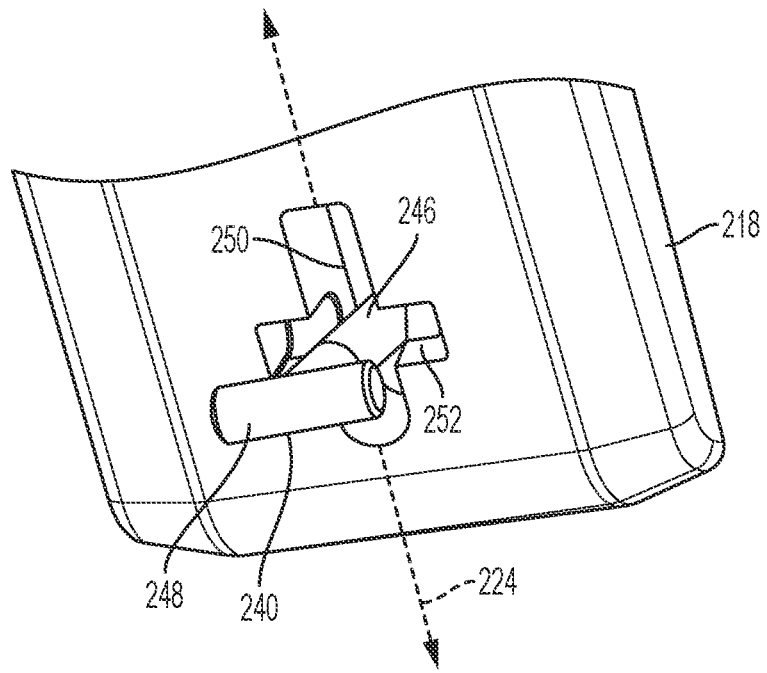
FIG. 9 is a detail view of the T-bolt and lower half of the fork mount of FIG. 6.

To clamp the crossbar, handle 242 may be employed to urge T-bolt 240 downward through aperture 250 and thereby move bolt head 248 clear of lower half 218. The handle may then be rotated, until bolt head 248 is aligned with a recess 252 in the lower surface of lower half 218 as shown in FIG. 9. When the handle is released, the nut may be retained by the recess, thereby maintaining the upper and lower halves in the clamped position.

In the pictured example, recess 252 is elongate and conforms closely to bolt head 248. A long axis of recess 252 is oriented generally perpendicular to the lateral extent of aperture 250, and to mount axis 224. In other examples, recess 252 may have any effective shape and may be oriented at any angle relative to aperture 250. Lower half 218 may also include any features or fasteners appropriate to selectively engage T-bolt 240.

Once bolt head 248 is received in recess 252, T-bolt 240 may be prevented from rotating. The handle may then be rotated relative to the bolt and screwed further onto the bolt. The upper half may be thereby urged toward lower half 218, and the fork mount may be securely clamped onto the crossbar.

Referring again to FIG. 8, the shaft of T-bolt 240 has a circular cross-section while passage 244 is elongate. That is, the passage does not conform closely to T-bolt 240 and instead is spaced from the bolt along a direction generally parallel to mount axis 224. Similarly, aperture 250 may be longer than bolt head 248. T-bolt 240 may therefore be able to extend through upper half 216 and lower half 218 at a range of angles. That is, T-bolt 240 may form an angle with mount axis 224 other than 90 degrees. FIG. 7 shows an example of such a configuration.

As lower half 218 pivots around bar 226, aperture 250 may be moved relative to passage 244 along mount axis 224. T-bolt 240 may angle to accommodate this relative movement and extend through aperture 250 when the aperture is not vertically aligned with passage 244. Bolt head 248 may also be retained in recess 252 at a range of angles, due to the corresponding rounded shapes of the nut and recess, shown in FIG. 9. Therefore, lower half 218 may be clamped at a range of pivot positions, allowing fork mount 210 to clamp a range of crossbar sizes.

As shown in FIG. 7, a cover 254 is mounted on upper half 216. The cover opens by pivoting about a bar 256 mounted in upper half 216, generally perpendicular to mount axis 224. The cover may latch closed by means of a snap-fit feature, or other fastener. Handle 242 has an elongate shape and extends up through cover 254. The cover includes an aperture that closely conforms to handle 242, when the handle is aligned with mount axis 224 as shown.

Referring again to FIG. 8, handle 242 may be coupled to T-bolt 240 such that the length of the handle is generally perpendicular to the length of bolt head 248. As a consequence, handle 242 may only be admitted to the aperture in cover 254 when bolt head 248 is aligned with recess 252 of lower half 218. Effectively, cover 254 may only be closed when head portion 214 is clamped.

This may serve as a visual indicator of the mount's clamp status to a user of fork mount 210, and may help prevent the user from neglecting to clamp the mount before securing a bicycle to the mount. Handle 242 is also prevented from rotating when cover 254 is closed. Cover 254 may therefore serve to further secure head portion 214 to the crossbar, and prevent accidental disengagement of the clamp during transportation of a bicycle.

In other examples head portion 214 may be monolithic, and may clamp to the first crossbar by other mechanisms. Any appropriate clamp or selective attachment may be included in the head portion. For example, head portion 214 may be configured to attach to a specific geometry of a particular crossbar design. For another example, head portion 214 may be configured to attach to an adaptor, that in turn engages a crossbar.

As shown in FIG. 8, another passage 258 extends laterally through first end 220 of upper half 216, in a direction parallel to the longitudinal axis of the crossbar. In some examples passage 258 may extend through lower half 218, or another part of head portion 214. The lateral passage is of sufficient size to accommodate connector assembly 212, which comprises a pair of selectable annular inserts 260 and an interchangeable skewer 262 with a cam lever 264 and an adjustment knob 266.

Each insert includes an outer engaging surface 268, a grip 270, and a lateral clamping surface 272. Outer engaging surface 268 of each insert is configured to engage an interior surface 274 of passage 258. Different configurations of the outer engaging surface may be employed to secure inserts 260 to head portion 214. In the pictured example, outer engaging surface 268 and a portion of interior surface 274 are threaded, such that the insert may be screwed into passage 258.

In an alternative example, outer engaging surface 268 and interior surface 274 may be shaped as complimentary cones. A projection may be disposed on the outer engaging surface, and a channel of sufficient size to accommodate the projection may be recessed into interior surface 274. The channel may extend laterally along the interior surface for some distance, and then deflect to one side at least sufficiently to accommodate the projection in the deflected portion of the channel. When the insert is installed, the projection may be aligned with the channel and the insert slid into passage 258, then the insert may be twisted to bring the projection into the deflected portion of the channel. The insert may be thereby retained in passage 258 and secured to head portion 214.

Grip 270 and lateral clamping surface 272 remain proud of head portion 214 when the insert is fully secured in passage 258. The grip may include a textured surface or be composed of a material appropriate to assist in the manual rotation of the grip. Grip 270 may facilitate installation of the inserts into head portion 214, and may remain proud of the surface of the head portion in order to facilitate removal.

Skewer 262 is of sufficient length to protrude through apertures in the tines of a bicycle front fork, passage 258, and inserts 260. The skewer has two ends, a first threaded end 276 and a second end 278 with cam lever 264. Adjustment knob 266 may be screwed onto the threaded end of the skewer once the skewer has been inserted through passage 258 and inserts 260.

Figure 10:
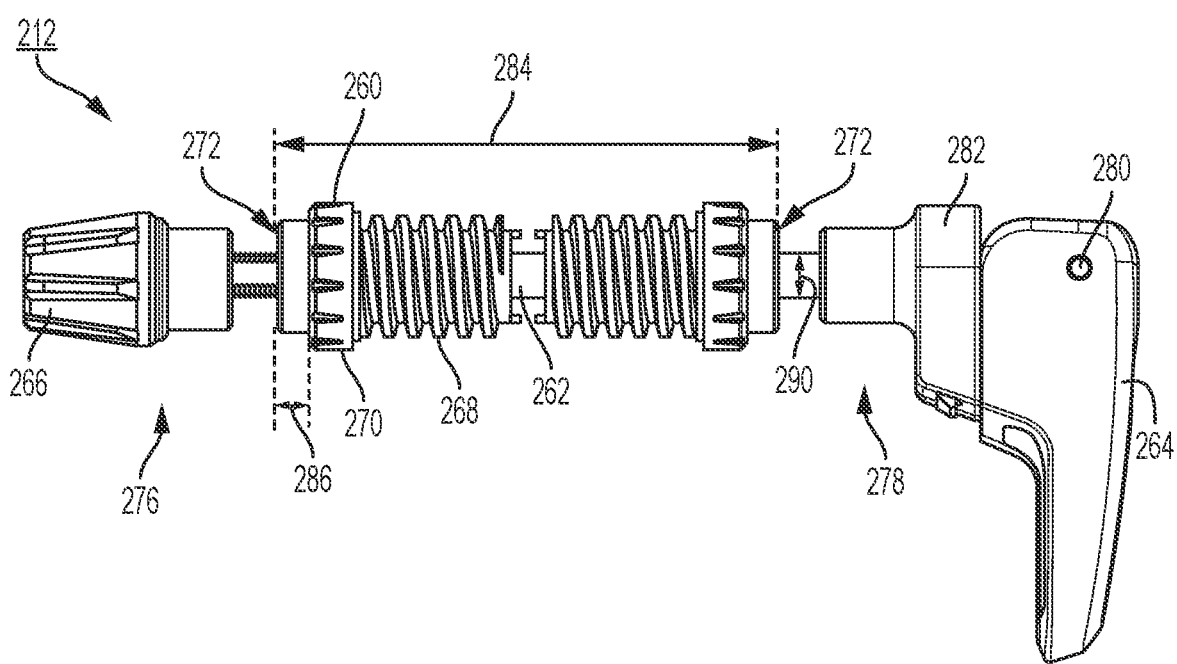
FIG. 10 is a front view of the connector assembly of the fork mount of FIG. 6.

FIG. 10 is a side view of connector assembly 212. Cam lever 264 has two positions, clamped and unclamped, and is shown in the clamped position. The lever pivots around an axis perpendicular to skewer 262 defined by a bar 280 that is coupled to the skewer. In addition, a brace 282 configured to engage cam lever 264 is slidably mounted on skewer 262 proximate the lever.

The distance between lateral clamping surfaces 272 defines a fork spacing 284 that may be a standard spacing from a set of fork spacing standards for bicycle front forks. Fork spacing 284 may also correspond to a wheel hub width. The fork spacing may be determined by a spacing dimension 286 of each insert 260, from an outer edge of grip 270 to clamping surface 272. Each annular insert 260 also has an inner channel with a diameter 288, shown in FIG. 11. Inner diameter 288 corresponds to a standard for bicycle axle diameter. The inner diameter 288 may also correspond to diameter 290 of interchangeable skewer 262 which in turn conforms to an axle size standard for bicycle front wheel axles.

A plurality of insert pairs may be provided as part of the bicycle carrier, having a plurality of fork spacings and inner diameters. Any appropriate combination of fork spacing and axle diameter may be represented in the provided insert pairs. It should be noted that the inner diameters of any two pairs of inserts may differ, but the inner diameters of the two inserts of a pair may match. If new standards for bicycle axle diameter or fork spacing are developed after a bicycle carrier has been put into use, additional inserts or skewers that conform to the new standards may be made available separately.

Figure 11:
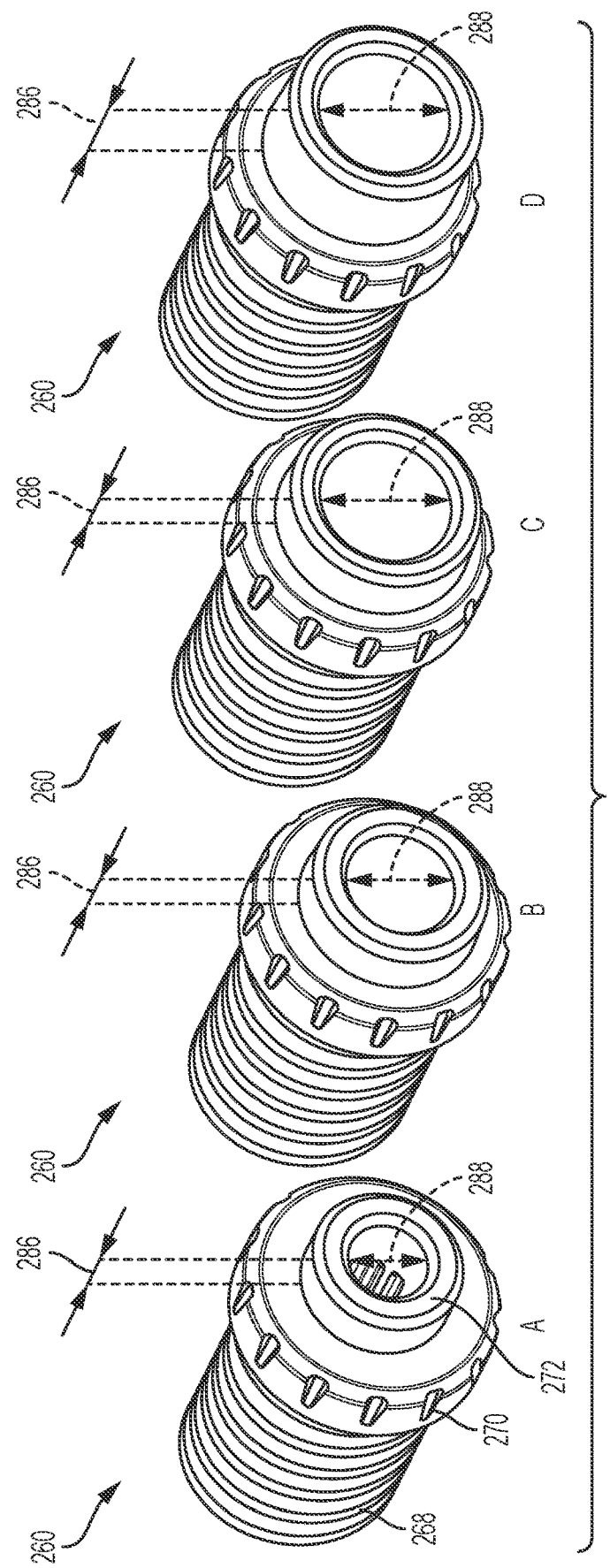
FIG. 11 is an isometric view of an exemplary set of selectable inserts.

Prior to securing a bicycle to the fork mount, a user may select a pair of inserts 260 with dimensions appropriate to the particular bicycle being secured. Each pair of inserts may be configured to be secured in the fork mount, and to accommodate an interchangeable skewer. Once a pair of inserts 260 has been selected and secured in the fork mount, the user may select a skewer 262 corresponding to the same axle standard as the selected inserts. FIG. 11 shows four exemplary inserts A, B, C, D, each representing one of a pair of matching inserts. Inserts A, B, and C have the same spacing dimension 286, but ascending inner diameters 288. By contrast, insert D has the same inner diameter as insert C, but has a greater spacing dimension. Therefore, inserts A, B, and would all be appropriate for bicycles made according to the same front fork spacing standard, but according to differing axle standards. Different interchangeable skewers 262 would be appropriate for the three inserts. However, the same skewer may be used with inserts C and D.

In some examples, tines of a bicycle front fork may include features configured to engage lateral surfaces of wheel hub. Clamping surface 272 of inserts 260 may be dimensioned or otherwise configured to engage such a feature. For instance, tines of a bicycle front fork may include a circular recess disposed about the dropout and a diameter of clamping surface 272 may correspond to a diameter of the lateral surface engaged on the wheel hub.

To secure bicycles with a drop-out style front forks, skewer 262 may be inserted through passage 258 and both inserts 260 of the fork mount with cam lever 264 in the open position. Adjustment knob 266 may be screwed onto threaded end 276 of the skewer until the knob and brace 282 are approximately correctly spaced from inserts 260. The dropouts of the bicycle front fork may then be placed over skewer 262, and cam lever 264 may be pivoted to clamped position. Adjustment knob 266 may be employed to further secure the tine and adjust the skewer while the cam lever remains in clamped position.

To secure bicycles with through-axle style front forks, skewer 262 may be interchanged for the axle of the front fork. The fork tines may be positioned abutting lateral clamping surfaces 272 of inserts 260, and the axle may be inserted through inserts 260, and the tines. The axle may be secured to the front fork according to the design of the bicycle. For instance, the axle may be threaded into a tine of the front fork, a cam lever may be engaged, and/or any method used to secure the axle when mounting a wheel to the front fork.

When either type of front fork is secured, a first tine of the front fork is clamped between lateral clamping surface 272 of a first insert 260 and brace 282, and the second tine of the front fork is clamped between lateral clamping surface 272 of the second insert and adjustment knob 266.

Example 3

Figure 12:
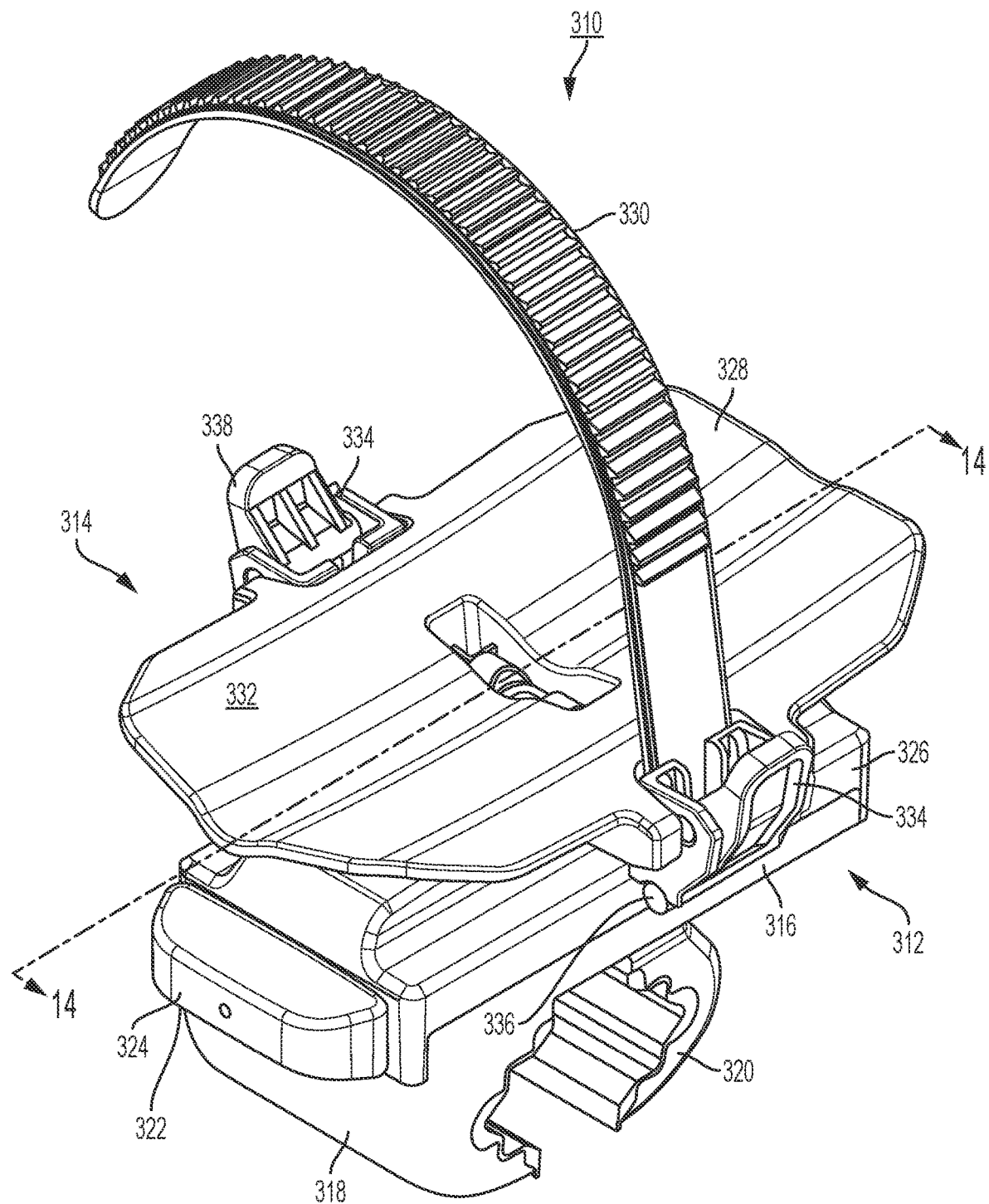
FIG. 12 is an isometric view of another example of a tail mount.
Figure 13:
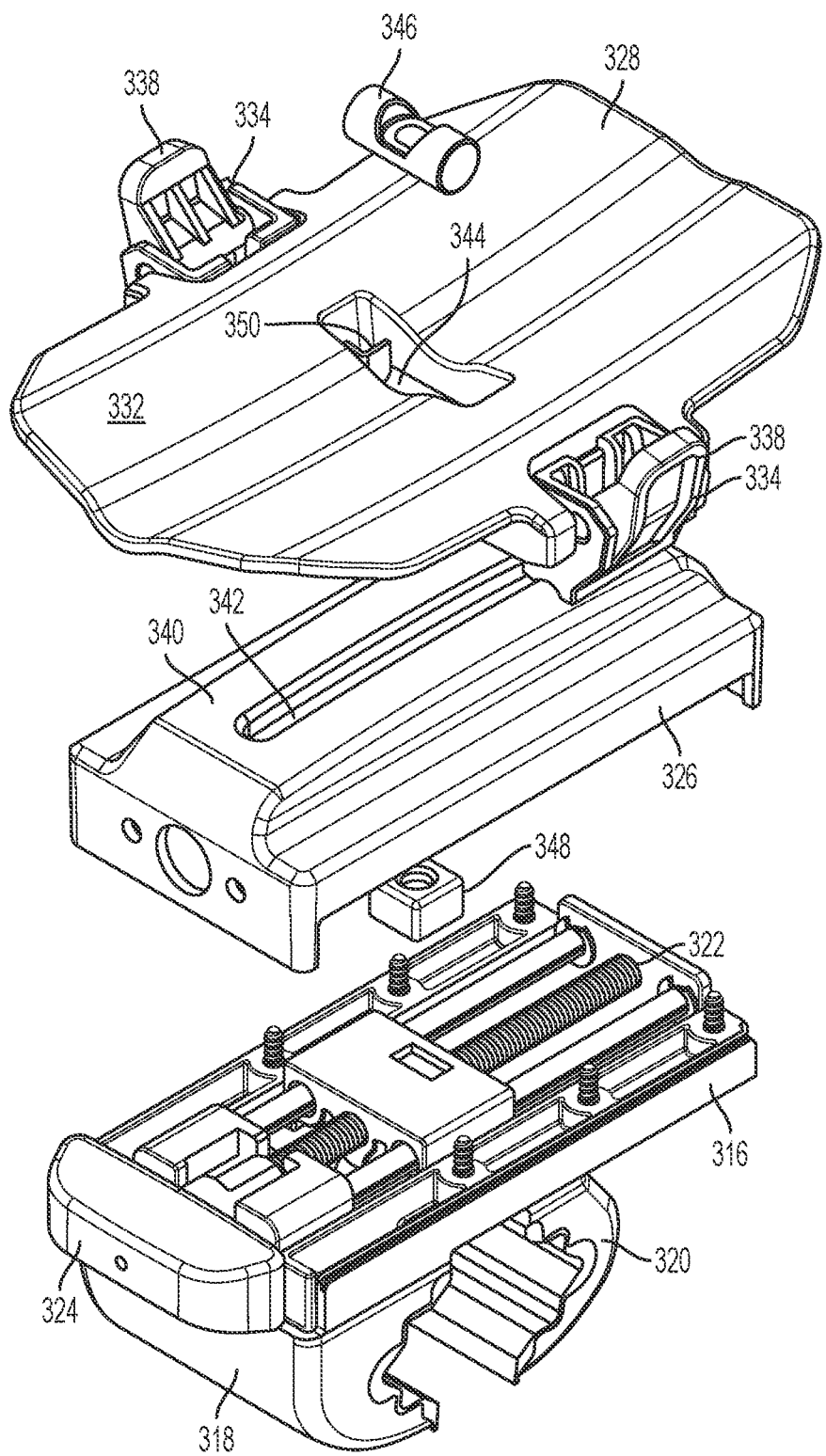
FIG. 13 is a partially exploded isometric view of the tail mount of FIG. 12.
Figure 14:
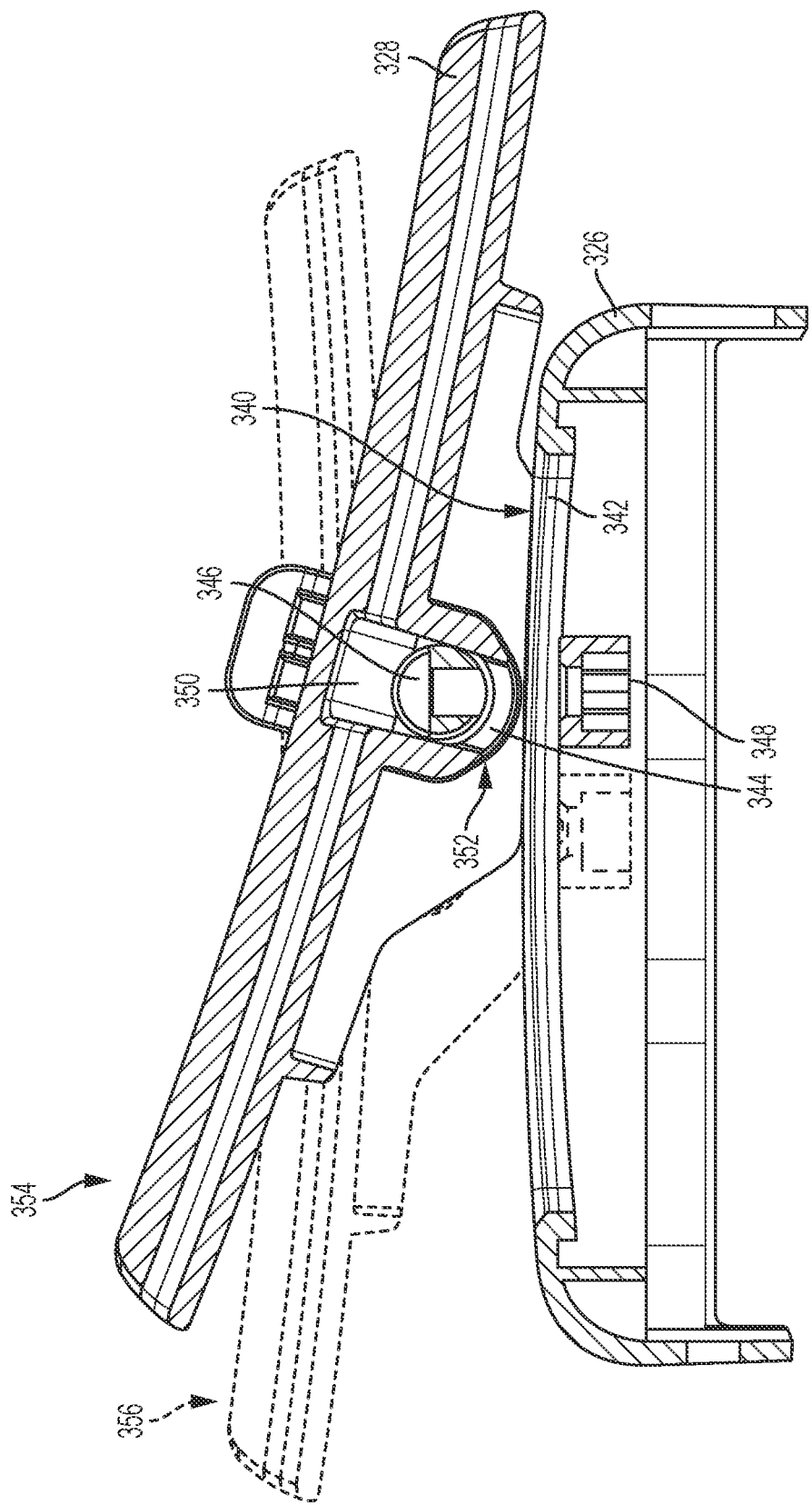
FIG. 14 is a cross-sectional view of the wheel clamp assembly of the tail mount of FIG. 12, taken along line 14-14 and showing two positions of the wheel tray.

As shown in FIGS. 12-14, this section describes a tail mount generally indicated at 310. Tail mount 310 includes a tail portion 312 and a wheel clamp assembly 314. The tail portion is configured to selectively clamp to a crossbar of a vehicle rooftop rack, where the crossbar has a long axis oriented perpendicular to a longitudinal axis of the vehicle. The wheel clamp assembly is configured to secure a bicycle rear wheel to the tail portion.

Any appropriate clamping mechanism may be used to clamp tail portion 312 to the second crossbar. In the example shown in FIGS. 12-13, tail portion 312 includes a body 316, a first arm 318, a second arm 320 and a clamp actuator 322 with a handle 324. First arm 318 is formed on body 316, proximate one end and extending down from the body. Second arm 320 is slidably coupled to body 316, extending down in a direction matching first arm 318. The second arm is also operatively coupled to clamp actuator 322, such that when handle 324 is rotated the actuator urges the second arm toward first arm 318, in order to clamp the crossbar between the first and second arms. First arm 318 and second arm 320 may be contoured to conform closely to opposite sides of the crossbar.

As shown in FIG. 12, wheel clamp assembly 314 includes a base 326, a wheel tray 328, and a strap 330. A rear wheel of a bicycle may rest on wheel tray 328, and be secured in position by strap 330. A channel may also be formed in an upper surface 332 of the wheel tray, to aid in correct positioning of the wheel. Base 326 is screwed or otherwise coupled to a top portion of body 316, thereby securing the wheel to tail portion 312 and thus securing the wheel to the crossbar.

Strap 330 is received and secured by two buckles 334 on opposing sides of wheel tray 328. In the pictured example, a first end of strap 330 includes a bead 336 for retaining or anchoring the strap in one of buckles 334, against upward tension. The strap and buckle may also include releasable snap-fit features to retain the strap in the buckle against gravity or other forces.

In order to anchor the first end of strap 330, a second end of the strap may be inserted from below, and up through the buckle until bead 336 engages the buckle. The first end of strap 330 may be releasable from the buckle so that the strap may be anchored in the other of buckles 334, to provide easy access on either side of a vehicle.

Once the first end of strap 330 is anchored in one of buckles 334, the second end of strap 330 may be passed through the spokes of the bicycle's rear wheel and then through the other of the buckles, to the extent necessary to secure the rear wheel of the bicycle to wheel tray 328. Strap 330 includes teeth for ratcheting receipt in either buckle, to hold tension on the strap and keep the wheel secured.

A lever component 338 in each buckle may be actuated to release the teeth when adjusting strap 330 or removing the secured bicycle. Also, buckles 334 may pivot around an axis perpendicular to both wheel tray 328 and the long axis of a clamped crossbar, allowing a greater range of strap orientation to secure wheels and tires of varying dimensions.

Strap 330 may be of any appropriate durable material, for example plastic or cut-resistant woven nylon fabric. In some examples, other types of adjustable buckle mechanism may be used, such as a ratchet strap. Any effective mechanism may be used to secure the rear wheel to wheel tray 328.

As shown in FIG. 13, base 326 has an upper convex surface 340. An elongated central aperture 342 extends longitudinally in the convex surface, and wheel tray 328 includes a central aperture 344 laterally aligned with aperture 342. A bolt, not pictured, may extend through apertures 342 and 344 to secure wheel tray 328 to base 326 by engaging with a top nut 346 and a bottom nut 348. Bottom nut 348 is disposed at an underside of elongated central aperture 342, and top nut 346 is disposed at an upper end of wheel tray central aperture 344. A recess 350 is formed in an upper surface 332 of wheel tray 328 and about central aperture 344, to receive top nut 346 such that the nut is flush with upper surface 332.

Wheel tray 328 is configured to be secured at a plurality of positions along upper convex surface 340 of base 326. As shown in FIG. 14, wheel tray 328 has a convex lower abutting surface 352 configured to rest on the upper convex surface of the base. Central aperture 344 may be laterally aligned with elongated central aperture 342 at any point along the longitudinal extent of aperture 342, and the bolt secured accordingly. Each position along upper convex surface 340 corresponds to a longitudinal position relative to the longitudinal axis of the vehicle.

Top nut 346 is a barrel nut with a generally circular cross-section, other than a recessed area to receive a head of the bolt. Recess 350 of wheel tray 328 is rounded to conform to top nut 346, and allows the nut to be retained at any angle. Central aperture 344 is larger than the shaft of a bolt appropriate to mate with top nut 346 and bottom nut 348, and may be longitudinally spaced from the bolt. Therefore, the bolt may extend through central aperture 344 at a range of angles. Together, these features may facilitate rotation of wheel tray 328 relative to base 326, as measured around the long axis of the crossbar. Wheel tray 328 may be pivoted through a range of angles, and may be secured at a desired angle when bolted to base 326.

A position and an angle for wheel tray 328 may be chosen to accommodate the dimensions of the bicycle, so that the rear wheel of the bicycle rests securely on upper surface 332 of the wheel tray. FIG. 14 shows wheel tray 328 in a first position 354 corresponding to a first position and angle, and a second position 356 corresponding to another position and another angle. Second position 354 may be appropriate for a longer bicycle than first position 354. Any appropriate combination of position and angle may be selected by a user.

In some examples, wheel tray 328 may be permanently fixed to base 326 or to the tail portion. The wheel clamp assembly may be pivotably coupled to the tail portion, or may be coupled at a fixed angle. In the present example two nuts and a bolt secure the wheel tray to the base, but in other examples any effective arrangement of fasteners may be used. Wheel tray 328 is shown with a curved and elongated shape. In other examples, the tray may be planar or contoured, may be square, circular, or any appropriate shape.

CONCLUSION

It is believed that the disclosure set forth herein encompasses multiple distinct inventions with independent utility. While each of these inventions has been disclosed in its preferred form, the specific examples thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

The various structural members disclosed herein may be constructed from any suitable material, or combination of materials, such as metal, plastic, nylon, plastic, rubber, or any other materials with sufficient structural strength to withstand the loads incurred during use. Materials may be selected based on their durability, flexibility, weight, and/or aesthetic qualities.

Although the present disclosure has been provided with reference to the foregoing operational principles and examples, it will be apparent to those skilled in the art that various changes in form and detail may be made without departing from the spirit and scope of the disclosure. The present disclosure is intended to embrace all such alternatives, modifications and variances. Where the disclosure recites "a," "a first," or "another" element, or the equivalent thereof, it should be interpreted to include one or more such elements, neither requiring nor excluding two or more such elements. Furthermore, any aspect shown or described with reference to a particular example should be interpreted to be compatible with any other example, alternative, modification, or variance.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A fork mount for securing a bicycle front fork, comprising:
   a head portion configured to selectively clamp to a crossbar having a passage generally parallel to a long axis of the crossbar when clamped to the crossbar;
   a first pair of selectable, annular, and interchangeable inserts configured to be secured at opposing ends of the passage of the head portion, wherein each insert has a hole;
   a skewer configured to protrude through apertures in the bicycle front fork, through the passage of the head portion, and through the holes in the first pair of selectable inserts, wherein each insert has threads on an external surface to engage the head portion and allow removal and replacement with another insert; and
   wherein the passage of the head portion is threaded to receive the first pair of selectable inserts.

2. The fork mount of claim 1, wherein the skewer includes a cam lever assembly and an adjustment knob.

3. The fork mount of claim 2, wherein each of the first pair of selectable inserts has a lateral clamping surface, such that the bicycle front fork abuts the lateral clamping surfaces and is secured against the lateral clamping surfaces by the cam lever assembly and the adjustment knob.

4. The fork mount of claim 3, wherein the lateral clamping surfaces define a fork spacing according to a fork spacing standard for a front fork of a bicycle.

5. The fork mount of claim 4, wherein the first pair of selectable inserts is selectable from a set of multiple pairs of inserts according to a plurality of fork spacing standards.

6. The fork mount of claim 1, wherein the skewer has an outer diameter and the first pair of selectable inserts have an inner diameter, such that the outer diameter and the inner diameter are according to an axle standard for a bicycle front wheel axle.

7. The fork mount of claim 6, wherein the inner diameter is consistent through a length of the first pair of selectable inserts.

8. The fork mount of claim 1, wherein the head portion includes an upper half having a plurality of bar cradles disposed at a plurality of vertical positions and a lower half having a bar configured to be received in each of the plurality of bar cradles such that the lower half is pivotable relative to the upper half.

9. The fork mount of claim 1, wherein the head portion and the first pair of selectable inserts are configured to receive an axle of a through-axle bicycle front fork.

10. The fork mount of claim 1, wherein the fork mount is configured to secure both quick release and through-axle bicycle front forks.

11. A bicycle carrier for securing a bicycle on a vehicle, comprising:
    a fork mount, including:
      a threaded passage;
      a pair of selectable, annular, and interchangeable inserts configured to be received in the passage and secured at opposing ends of the passage, wherein each insert has a hole and threads on an external surface to engage the passage; and
      a skewer configured to protrude through apertures in a front fork of the bicycle, through the passage, and through the hole in each of the pair of inserts; and
    a tail mount configured to support a rear wheel of the bicycle.

12. The bicycle carrier of claim 11, wherein the pair of inserts are selectable from a set of pairs of inserts and the skewer is interchangeable with an axle of a through-axle bicycle front fork.

13. The bicycle carrier of claim 12, wherein the interchangeable skewer has a diameter according to an axle standard for a bicycle front wheel, and each pair of selectable inserts defines a fork spacing according to a fork spacing standard for a front fork of a bicycle.

14. The bicycle carrier of claim 11, wherein the fork mount is configured to secure both quick release and through-axle bicycle front forks.

15. The bicycle carrier of claim 11, wherein each of the pair of inserts has a lateral clamping surface, such that a front fork of the bicycle abuts the lateral clamping surfaces and is secured against the lateral clamping surfaces.

16. The bicycle carrier of claim 11, wherein the fork mount and the tail mount each comprise a portion of a tray rack.

17. A fork mount for securing a bicycle front fork, comprising:
    a head portion having a threaded passage generally perpendicular to a length of a bicycle, when a front fork of the bicycle is secured to the fork mount;
    a first pair of selectable, annular, and interchangeable inserts configured to be received in the passage of the head portion and secured at opposing ends of the passage, wherein each insert has a hole and has threads on an external surface to engage the passage of the head portion and allow removal and replacement with another insert;
    a skewer configured to protrude through apertures in the bicycle front fork, through the passage of the head portion, and through the holes in the first pair of selectable inserts.

18. The fork mount of claim 17, wherein the head portion is configured to selectively clamp to a crossbar on a vehicle.

19. The fork mount of claim 17, wherein:
    the skewer includes a cam lever assembly and an adjustment knob; and
    each of the first pair of selectable inserts has a lateral clamping surface, such that the bicycle front fork abuts the lateral clamping surfaces and is secured against the lateral clamping surfaces by the cam lever assembly and the adjustment knob.

20. The fork mount of claim 19, wherein the lateral clamping surfaces define a fork spacing according to a fork spacing standard for a front fork of a bicycle.

* * * * *